(12) United States Patent
West

(10) Patent No.: US 9,052,772 B2
(45) Date of Patent: Jun. 9, 2015

(54) HEURISTICS FOR 3D AND 6D TOUCH GESTURE TOUCH PARAMETER CALCULATIONS FOR HIGH-DIMENSIONAL TOUCH PARAMETER (HDTP) USER INTERFACES

(75) Inventor: Perry West, Belmont, CA (US)

(73) Assignee: Lester F. Ludwig, San Antonio, TX (US)

( * ) Notice: Subject to any disclaimer, the term of this patent is extended or adjusted under 35 U.S.C. 154(b) by 222 days.

(21) Appl. No.: 13/572,605

(22) Filed: Aug. 10, 2012

(65) Prior Publication Data

US 2013/0038554 A1 Feb. 14, 2013

Related U.S. Application Data

(60) Provisional application No. 61/522,239, filed on Aug. 10, 2011.

(51) Int. Cl.
*G06F 3/041* (2006.01)
(52) U.S. Cl.
CPC .... *G06F 3/0416* (2013.01); *G06F 2203/04104* (2013.01)
(58) Field of Classification Search
USPC ...................... 178/18.01–18.11; 345/173–178
See application file for complete search history.

(56) References Cited

U.S. PATENT DOCUMENTS

| | | |
|---|---|---|
| 4,748,676 A | 5/1988 | Miyagawa |
| 4,899,137 A | 2/1990 | Behrens et al. |
| 5,237,647 A | 8/1993 | Roberts et al. |
| 5,270,711 A | 12/1993 | Knapp |
| 5,292,999 A | 3/1994 | Tumura |
| 5,341,133 A | 8/1994 | Savoy |
| 5,347,295 A | 9/1994 | Agulnick et al. |
| 5,357,048 A | 10/1994 | Sgroi |
| 5,378,850 A | 1/1995 | Tumura |
| 5,386,219 A | 1/1995 | Greanias |
| 5,420,936 A | 5/1995 | Fitzpatrick |
| 5,440,072 A | 8/1995 | Willis |
| 5,442,168 A | 8/1995 | Gurner et al. |
| 5,459,282 A | 10/1995 | Willis |
| 5,471,008 A | 11/1995 | Fujita et al. |
| 5,475,214 A | 12/1995 | DeFranco et al. |

(Continued)

FOREIGN PATENT DOCUMENTS

EP 0 574 213 A1 12/1993

OTHER PUBLICATIONS

Moog, R. A., The Human Finger-A Versatile Electronic Music Instrument Component, Audio Engineering Society Preprint, 1977, New York, NY, 4 pgs.

(Continued)

*Primary Examiner* — Latanya Bibbins

(57) ABSTRACT

A method for determining the position of touches on a touch sensor is described including receiving values from a touch sensor, converting the values to binary data, identifying one or more contiguous touched regions, extracting parameters from each touched region that related to the shape and location of each region, and determining the validity of each region. The method also includes obtaining data from the contiguous touched regions at a later time and linking the data of the two times for the touched regions to create a series of temporal parameters. The data for the temporal parameters is filtered to remove noise, and the position of the touches is determined from the temporal parameters.

14 Claims, 12 Drawing Sheets

(56) References Cited

U.S. PATENT DOCUMENTS

| | | |
|---|---|---|
| 5,483,261 A | 1/1996 | Yasutake |
| 5,565,641 A | 10/1996 | Gruenbaum |
| 5,585,588 A | 12/1996 | Tumura |
| 5,592,572 A | 1/1997 | Le |
| 5,592,752 A | 1/1997 | Fu |
| 5,659,145 A | 8/1997 | Weil |
| 5,659,466 A | 8/1997 | Norris et al. |
| 5,665,927 A | 9/1997 | Taki et al. |
| 5,668,338 A | 9/1997 | Hewitt et al. |
| 5,675,100 A | 10/1997 | Hewlett |
| 5,717,939 A | 2/1998 | Bricklin et al. |
| 5,719,347 A | 2/1998 | Masubachi et al. |
| 5,719,561 A | 2/1998 | Gonzales |
| 5,724,985 A | 3/1998 | Snell |
| 5,741,993 A | 4/1998 | Kushimiya |
| 5,748,184 A | 5/1998 | Shieh |
| 5,763,806 A | 6/1998 | Willis |
| 5,786,540 A | 7/1998 | Westlund |
| 5,801,340 A | 9/1998 | Peter |
| 5,805,137 A | 9/1998 | Yasutake |
| 5,808,605 A | 9/1998 | Shieh |
| 5,824,930 A | 10/1998 | Ura et al. |
| 5,827,989 A | 10/1998 | Fay et al. |
| 5,841,428 A | 11/1998 | Jaeger et al. |
| 5,850,051 A | 12/1998 | Machover et al. |
| 5,852,251 A | 12/1998 | Su et al. |
| 5,889,236 A | 3/1999 | Gillespie et al. |
| 5,932,827 A | 8/1999 | Osborne et al. |
| 5,969,283 A | 10/1999 | Looney et al. |
| 5,977,466 A | 11/1999 | Muramatsu |
| 5,986,224 A | 11/1999 | Kent |
| 6,005,545 A | 12/1999 | Nishida et al. |
| 6,037,937 A | 3/2000 | Beaton et al. |
| 6,047,073 A | 4/2000 | Norris et al. |
| 6,051,769 A | 4/2000 | Brown, Jr. |
| 6,100,461 A | 8/2000 | Hewitt |
| 6,107,997 A | 8/2000 | Ure |
| 6,140,565 A | 10/2000 | Yamauchi et al. |
| 6,204,441 B1 | 3/2001 | Asahi et al. |
| 6,225,975 B1 | 5/2001 | Furuki et al. |
| 6,285,358 B1 | 9/2001 | Roberts |
| 6,288,317 B1 | 9/2001 | Willis |
| 6,310,279 B1 | 10/2001 | Suzuki et al. |
| 6,310,610 B1 | 10/2001 | Beaton et al. |
| 6,320,112 B1 | 11/2001 | Lotze |
| 6,323,846 B1 | 11/2001 | Westerman et al. |
| 6,360,019 B1 | 3/2002 | Chaddha |
| 6,363,159 B1 | 3/2002 | Rhoads |
| 6,373,475 B1 | 4/2002 | Challis |
| 6,392,636 B1 | 5/2002 | Ferrari |
| 6,392,705 B1 | 5/2002 | Chaddha |
| 6,400,836 B2 | 6/2002 | Senior |
| 6,404,898 B1 | 6/2002 | Rhoads |
| 6,408,087 B1 | 6/2002 | Kramer |
| 6,570,078 B2 | 5/2003 | Ludwig |
| 6,703,552 B2 | 3/2004 | Haken |
| 6,793,619 B1 | 9/2004 | Blumental |
| 7,030,860 B1 | 4/2006 | Hsu |
| 7,408,108 B2 | 8/2008 | Ludwig |
| 7,557,797 B2 | 7/2009 | Ludwig |
| 7,598,949 B2 | 10/2009 | Han |
| 7,611,409 B2 | 11/2009 | Muir et al. |
| 8,154,529 B2 | 4/2012 | Sleeman |
| 8,169,414 B2 | 5/2012 | Lim |
| 8,170,346 B2 | 5/2012 | Ludwig |
| 8,179,376 B2 | 5/2012 | Griffin |
| 8,345,014 B2 | 1/2013 | Lim |
| 2001/0036299 A1 | 11/2001 | Senior |
| 2002/0005108 A1 | 1/2002 | Ludwig |
| 2002/0093491 A1 | 7/2002 | Gillespie et al. |
| 2004/0074379 A1 | 4/2004 | Ludwig |
| 2004/0118268 A1 | 6/2004 | Ludwig |
| 2004/0251402 A1 | 12/2004 | Reime |
| 2005/0179651 A1 | 8/2005 | Ludwig |
| 2006/0086896 A1 | 4/2006 | Han |
| 2006/0252530 A1 | 11/2006 | Oberberger et al. |
| 2007/0044019 A1 | 2/2007 | Moon |
| 2007/0063990 A1 | 3/2007 | Park |
| 2007/0229477 A1 | 10/2007 | Ludwig |
| 2008/0010616 A1 | 1/2008 | Algreatly |
| 2008/0034286 A1 | 2/2008 | Selby |
| 2008/0143690 A1 | 6/2008 | Jang |
| 2008/0164076 A1 | 7/2008 | Orsley |
| 2008/0259053 A1 | 10/2008 | Newton |
| 2008/0297482 A1 | 12/2008 | Weiss |
| 2008/0300055 A1 | 12/2008 | Lutnick |
| 2008/0309634 A1 | 12/2008 | Hotelling et al. |
| 2009/0006292 A1 | 1/2009 | Block |
| 2009/0027351 A1 | 1/2009 | Zhang et al. |
| 2009/0124348 A1 | 5/2009 | Yoseloff et al. |
| 2009/0146968 A1 | 6/2009 | Narita et al. |
| 2009/0167701 A1 | 7/2009 | Ronkainen |
| 2009/0254869 A1* | 10/2009 | Ludwig et al. ............... 715/863 |
| 2010/0013860 A1 | 1/2010 | Mandella |
| 2010/0044121 A1 | 2/2010 | Simon |
| 2010/0060607 A1 | 3/2010 | Ludwig |
| 2010/0079385 A1 | 4/2010 | Holmgren |
| 2010/0087241 A1 | 4/2010 | Nguyen et al. |
| 2010/0090963 A1 | 4/2010 | Dubs |
| 2010/0110025 A1 | 5/2010 | Lim |
| 2010/0117978 A1 | 5/2010 | Shirado |
| 2010/0177118 A1 | 7/2010 | Sytnikov |
| 2010/0231612 A1 | 9/2010 | Chaudhri et al. |
| 2010/0232710 A1 | 9/2010 | Ludwig |
| 2010/0289754 A1 | 11/2010 | Sleeman et al. |
| 2010/0302172 A1 | 12/2010 | Wilairat |
| 2010/0328032 A1 | 12/2010 | Rofougaran |
| 2011/0007000 A1 | 1/2011 | Lim |
| 2011/0037735 A1 | 2/2011 | Land |
| 2011/0063251 A1 | 3/2011 | Geaghan |
| 2011/0086706 A1 | 4/2011 | Zalewski |
| 2011/0202889 A1 | 8/2011 | Ludwig |
| 2011/0202934 A1 | 8/2011 | Ludwig |
| 2011/0210943 A1 | 9/2011 | Zaliva |
| 2011/0260998 A1 | 10/2011 | Ludwig |
| 2011/0261049 A1 | 10/2011 | Cardno et al. |
| 2011/0285648 A1 | 11/2011 | Simon et al. |
| 2012/0007821 A1 | 1/2012 | Zaliva |
| 2012/0034978 A1 | 2/2012 | Lim |
| 2012/0056846 A1 | 3/2012 | Zaliva |
| 2012/0108323 A1 | 5/2012 | Kelly et al. |
| 2012/0192119 A1 | 7/2012 | Zaliva |
| 2012/0194461 A1 | 8/2012 | Lim |
| 2012/0194462 A1 | 8/2012 | Lim |
| 2012/0195522 A1 | 8/2012 | Ludwig |
| 2012/0206377 A1* | 8/2012 | Zhao et al. ................. 345/173 |
| 2012/0223903 A1 | 9/2012 | Ludwig |
| 2012/0235940 A1 | 9/2012 | Ludwig |
| 2012/0262401 A1 | 10/2012 | Rofougaran |
| 2012/0280927 A1 | 11/2012 | Ludwig |
| 2012/0317521 A1 | 12/2012 | Ludwig |
| 2013/0009896 A1 | 1/2013 | Zaliva |
| 2013/0016045 A1* | 1/2013 | Zhao et al. ................. 345/173 |
| 2013/0038554 A1 | 2/2013 | West |

OTHER PUBLICATIONS

Johnson, C., Image sensor tracks moving objects in hardware, Electronic Engineering Times, Apr. 5, 1999, 1 pg.

Kaoss pad dynamic effect/controller, Korg Proview Users' magazine Summer 1999, 2 pgs.

Leiberman, D., Touch screens extend grasp Into consumer realm, Electronic Engineering Times, Feb. 8, 1999.

Lim, et al., A Fast Algorithm for Labelling Connected Components in Image Arrays, Technical Report Series, No. NA86-2, Thinking Machines Corp., 1986 (rev. 1987), Cambridge, Mass., USA, 17 pgs.

Pennywitt, K., Robotic Tactile Sensing, Byte, Jan. 1986, 14 pgs.

Review of KORG X-230 Drum (later called Wave Drum), Electronic Musician, Apr. 1994, 1 pg.

Rich, R., Buchla Lightning MIDI Controller, Electronic Musician, Oct. 1991, 5 pgs.

Rich, R., Buchla Thunder, Electronic Musician, Aug. 1990, 4 pgs.

Dario P., et al., Tactile sensors and the gripping challenge, IEEE Spectrum, vol. 5, No. 22, Aug. 1985, pp. 46-52.

(56) References Cited

OTHER PUBLICATIONS

Snell, J. M., Sensors for Playing Computer Music with Expression, Proceedings of the Intl. Computer Music Conf. at Eastman, 1983, pp. 113-126.
Verner J., Artif Starr Switch Company Ztar 624-D, Electronic Musician, Nov. 1994, 5 pgs.
Lippold Haken, An Indiscrete Music Keyboard, Computer Music Journal, Spring 1998, pp. 30-48.
USPTO Notice of Allowance dated May 8, 2013 issued in U.S. Appl. No. 12/541,948, filed Aug. 15, 2009.
Buxton, W. A. S., Two-Handed Document Navigation, Xerox Disclosure Journal, 19(2), Mar./Apr. 1994 [online] URL: http://www.billbuxton.com/2Hnavigation.html, pp. 103-108.
USPTO Notice of Allowance dated Mar. 20, 2012 issued in U.S. Appl. No. 12/724,413, filed Mar. 15, 2010.
USPTO Notice of Allowance dated Jan. 10, 2008 issued in U.S. Appl. No. 10/683,914, filed Oct. 10, 2003.
USPTO Notice of Allowance dated Nov. 9, 2012 issued in U.S. Appl. No. 12/502,230, filed Jul. 13, 2009.
USPTO Notice of Allowance dated Mar. 12, 2012 issued in U.S. Appl. No. 12/511,930, filed Jul. 29, 2009.
USPTO Notice of Allowance dated May 16, 2013 issued in U.S. Appl. No. 13/441,842, filed Apr. 7, 2012.
USPTO Notice of Allowance dated May 24, 2013 issued in U.S. Appl. No. 13/442,815, filed Apr. 9, 2012.
USPTO Notice of Allowance dated Dec. 24, 2002 issued in U.S. Appl. No. 09/812,870, filed Mar. 19, 2001.
Otsu's method, [online] [retrieved on Jun. 26, 2013] URL: http://en.wikipedia.org/wiki/Otsu_method, Sep. 13, 2010, 2 pgs.
Principal component analysis, [online] [retrieved on Jun. 26, 2013] URL: http://en.wikipedia.org/wiki/Principal_component_analysis, Feb. 25, 2011, 9 pgs.
USPTO Notice of Allowance dated May 30, 2013 issued in U.S. Appl. No. 13/442,806, filed Apr. 9, 2012.
DIY Touchscreen Analysis, MOTO, [online] [retrieved on May 12, 2013] URL: http://labs.moto.com/diy-touchscreen-analysis/, Jul. 15, 2010, 23 pgs.
Wilson, T.V., How the iPhone Works, howstuffworks, [online] [retrieved on May 12, 2013] URL: http://electronics.howstuffworks.com/iphone2.htm, Jan. 8, 2011, 11 pgs.
Walker, G., Touch and the Apple iPhone, Veritas et Visus, [online] [retrieved on May 12, 2013] URL: http://www.veritasetvisus.com/VVTP-12,%20Walker.pdf, Feb. 2007, pp. 50-54.
Han, J., Multi-Touch Sensing through LED Matrix Displays (video), [online] [retrieved on May 12, 2013] "http://cs.nyu.edu/~jhan/ledtouch/index.html," Feb. 18, 2011, 1 pg.
Roberts Cross, [online] [retrieved on May 12, 2013] URL: http://en.wikipedia.org/wiki/Roberts_Cross, Jul. 20, 2010, visited Feb. 28, 2011, 3 pgs.
Sobel Operator, [online] [retrieved on May 12, 2013] URL: http://en.wikipedia.org/wiki/Sobel_operator, Mar. 12, 2010, visited Feb. 28, 2011, 5 pgs.
Prewitt, [online] [retrieved on May 12, 2013] URL: http://en.wikipedia.org/wiki/Prewitt, Mar. 15, 2010, visited Feb. 28, 2011, 2 pgs.
Coefficient of variation, [online] [retrieved on May 12, 2013] URL: http://en.wikipedia.org/wiki/Coefficient_of_variation, Feb. 15, 2010, visited Feb. 28, 2011, 2 pgs.
Canny edge detector, [online] [retrieved on May 12, 2013] http://en.wikipedia.org/wiki/Canny_edge_detector, Mar. 5, 2010, 4 pgs.
Polynomial regression, [online] [retrieved on May 12, 2013] http://en.wikipedia.org/wiki/Polynomial_regression, Jul. 24, 2010, 4 pgs.
Pilu,M., et al., Training PDMs on models: The Case of Deformable Superellipses, Proceedings of the 7th British Machine Vision Conference, Edinburgh, Scotland, 1996, pp. 373-382, [online] [retrieved on Feb. 28, 2011] URL: https://docs.google.com/viewera=v&pid=explorer&chrome=true&srcid=0BxWzm3JBPnPm-NDI1MDIxZGUtNGZhZi00NzJhLWFhZDMtNTJmYmRiMWYy-MjBh&authkey=CPeVx4wO&hl=en.
Osian M., et. al., Fitting Superellipses to Incomplete Contours, IEEE Computer Society Conference on Computer Vision and Pattern Recognition Workshops (CVPRW '04), Jun. 2004, 8 pgs.
Hough transform, [online] [retrieved on Feb. 13, 2010] URL: http://en.wikipedia.org/wiki/Hough_transform, Feb. 13, 2010, 7 pgs.
Tactile Pressure Measurement, Pressure Mapping Systems, and Force Sensors and Measurement Systems, [online] [retrieved on Aug. 6, 2013] URL: http://www.tekscan.com, 2 pgs.
Tactile Surface Pressure and Force Sensors,Sensor Products LLC, Oct. 26, 2006, [online] [retrieved on Aug. 6, 2013] URL: http://www.sensorprod.com, 2 pgs.
Pressure Profile Systems, Jan. 29, 2011, [online] [retrieved on Jan. 29, 2011] URL: http://www.pressureprofile.com, 1 pg.
Xsensor Technology Corporation, Feb. 7, 2011, [online] [retrieved on May 12, 2013] URL: http://www.xsensor.com, 1 pg.
Balda AG, Feb. 26, 2011, [online] [retrieved on May 12, 2013] URL: http://www.balda.de, 1 pg.
Cypress Semiconductor, Feb. 28, 2011, [online] [retrieved on May 12, 2013] URL: http://www.cypress.com, 1 pg.
Synaptics, Jan. 28, 2011, [online] [retrieved on May 12, 2013] URL: http://www.synaptics.com, 1 pg.
Venolia, D., et al., T-Cube: A Fast, Self-Disclosing Pen-Based Alphabet, CHI '94 Proceedings of the SIGCHI Conference on Human Factors in Computing Systems, Apr. 24-28, 1994, pp. 265-270.
Davis, R. C., et al., NotePals: Lightweight Note Taking by the Group, for the Group, University of California, Berkeley, Computer Science Division, 1998, 8 pgs.
Rekimoto, Jun, Pick-and-Drop: A Direct Manipulation Technique for Multiple Computer Environments, Sony Computer Science Laboratory Inc., Tokyo, Japan, 1997, [online] [retrieved on May 30, 2013] URL: http://www.sonycsl.co.jp/person/rekimoto/papers/uist97.pdf, 8 pgs.
Davis, R. C., et al., NotePals: Lightweight Note Sharing by the Group, for the Group, [online] [retrieved on Jun. 2, 2013] URL: http://dub.washington.edu:2007/projects/notepals/pubs/notepals-chi99-final.pdf, 9 pgs.
Want, R., et al., The PARCTAB ubiquitous computing experiment, 1995-1996, [online] [retrieved on Jun. 10, 2013] URL: http://www.ece.rutgers.edu/~parashar/Classes/02-03/ece572/perv-reading/the-parctab-ubiquitous-computing.pdf, 44 pgs.
Dulberg, M. S., et al. An Imprecise Mouse Gesture for the Fast Activation of Controls, IOS Press, Aug. 1999, [online] [retrieved on Jul. 9, 2013] URL: http://www.csc.ncsu.edu/faculty/stamant/papers/interact.pdf.gz, 10 pgs.
Moyle, M., et al. A Flick in the Right Direction: A Case Study of Gestural Input, Conferences in Research and Practice in Information Technology, vol. 18, Jan. 2005; New Zealand, [online] [retrieved on Jul. 9, 2013] URL:http://www.cosc.canterbury.ac.nz/andrew.cockburn/papers/moyle-cockburn.pdf, 27 pg.
Maltoni, D., et al., "Handbook of Fingerprint Recognition," Springer Professional Computing, 2nd ed. 2009, XVI, p. 74, p. 361, [online] [retrieved on Jul. 9, 2013] URL: http://books.google.com/books?id=1Wpx25D8qOwC&pg=PA361&Ipg=PA361&dq=fingerprint+minutiae, 2 pgs.
VeriFinger Information, [online] [retrieved on Jun. 11, 2013] URL: http://www.fingerprint-it.com/_sol_verifinger.html, 2 pgs.
Prabhakar S., et al., Learning fingerprint minutiae location and type, Pattern Recognition 2003, 36, [online] URL:http://www.cse.msu.edu/biometrics/Publications/Fingerprint/PrabhakarJainPankanti_MinaLocType_PR03.pdf, pp. 1847-1857.
Garcia Reyes, E., An Automatic Goodness Index to Measure Fingerprint Minutiae Quality, Progress in Pattern Recognition, Image Analysis and Applications, Lecture Notes in Computer Science vol. 3773, 2005, pp. 578-585, [online] [retrieved on Jun. 2, 2013] URL: http://www.researchgate.net/publication/226946511_An_Automatic_Goodness_Index_to_Measure_Fingerprint_Minutiae_Quality/file/d912f50ba5e96320d5.pdf.
Kayaoglu, M., et al., Standard Fingerprint Databases: Manual Minutiae Labeling and Matcher Performance Analyses, arXiv preprint arXiv:1305.1443, 2013, 14 pgs, [online] [retrieved on Jun. 2, 2013] URL: http://arxiv.org/ftp/arxiv/papers/1305/1305.1443.pdf.
Alonso-Fernandez, F., et al., Fingerprint Recognition, Chapter 4, Guide to Biometric Reference Systems and Performance Evaluation,

(56) References Cited

OTHER PUBLICATIONS (Springer, London, 2009, pp. 51-90, [online] [retrieved on Jun. 2, 2013] URL: http://www2.hh.se/staff/josef/public/publications/alonso-fernandez09chapter.pdf.

Image moment, Jul. 12, 2010, 3 pgs, [online] [retrieved on Jun. 13, 2013] URL: http://en.wikipedia.org/wiki/Image_moment.

Nguyen, N., et al., Comparisons of sequence labeling algorithms and extensions, Proceedings of the 24th International Conference on Machine Learning, 2007, [online] [retrieved on Jun. 2, 2013] URL: http://www.cs.cornell.edu/~nhnguyen/icmI07structured.pdf, pp. 681-688.

Nissen, S., Implementation of a Fast Artificial Neural Network Library (FANN), Department of Computer Science University of Copenhagen (DIKU)}, Oct. 31, 2003, [online] [retrieved on Jun. 21, 2013] URL: http://mirror.transact.net.au/sourceforge/f/project/fa/fann/fann_doc/1.0/fann_doc_complete_1.0.pdf, 92 pgs.

Igel, C., et al., Improving the Rprop Learning Algorithm, Proceedings of the Second International ICSC Symposium on Neural Computation (NC 2000), 2000, 2000, [online] [retrieved on Jun. 2, 2013] URL: http://citeseerx.ist.psu.edu/viewdoc/download?doi=10.1.1.17.3899&rep=rep1&type=pdf, pp. 115-121.

Bishop, C.M., Pattern Recognition and Machine Learning, Springer New York, 2006, pp. 561-593.

Euler Angles, 2011, [online] [retrieved on Jun. 30, 2011] URL: http://en.wikipedia.org/w/index.php?title=Euler_angles&oldid=436460926, 8 pgs.

Electronic Statistics Textbook, StatSoft, Inc., 2011, [online] [retrieved on Jul. 1, 2011] URL: http://www.statsoft.com/textbook, 1 pg.

Central Moment, Dec. 16, 2009, [online] [retrieved on Oct. 26, 2010] URL: http://en.wikipedia.org/w/index.php?title=Central_moment&oldid=332048374.

Local regression, Nov. 16, 2010, [online] [retrieved on Jun. 28, 2011] URL: http://en.wikipedia.org/w/index.php?title=Local_regression&oldid=416762287.

USPTO Notice of Allowance dated Jun. 6, 2013 issued in U.S. Appl. No. 13/846,830, filed Mar. 18, 2013.

Hernandez-Leon, R., et al., Classifying using Specific Rules with High Confidence, 9th Mexican International Conference on Artificial Intelligence, IEEE, Nov. 2010, pp. 75-80.

Fang, Y., et al., Dynamics of a Winner-Take-All Neural Network, Neural Networks, 9(7), Oct. 1996, pp. 1141-1154.

* cited by examiner

HEURISTICS FOR 3D AND 6D TOUCH GESTURE TOUCH PARAMETER CALCULATIONS FOR HIGH-DIMENSIONAL TOUCH PARAMETER (HDTP) USER INTERFACES

COPYRIGHT & TRADEMARK NOTICES

A portion of the disclosure of this patent document may contain material, which is subject to copyright protection. Certain marks referenced herein may be common law or registered trademarks of the applicant, the assignee or third parties affiliated or unaffiliated with the applicant or the assignee. Use of these marks is for providing an enabling disclosure by way of example and shall not be construed to exclusively limit the scope of the disclosed subject matter to material associated with such marks.

BACKGROUND OF THE INVENTION

This present invention relates to High-Dimensional Touch Parameter (HDTP) user interfaces, and in part particular to a method of determining the position and pose of a finger tip or other user contact with a touch sensor.

High-Dimensional Touch Parameter (HDTP) user interfaces have been taught in a number of issued patents and pending patent applications. In particular, pending U.S. Ser. No. 13/038,365 ("Touch-Based User Interfaces Employing Artificial Neural Networks for HDTP Parameter and Symbol Derivation"), pending U.S. Ser. No. 13/180,512 ("Sequential Classification Recognition of Gesture Primitives and Window-Based Parameter Smoothing For High Dimensional Touchpad (HDTP) User Interfaces"), and pending U.S. Ser. No. 13/544,960 ("HDTP Gesture Recognition") describe example systems and methods for use of Artificial Neural Networks (ANNs) for use in gesture classification and recognition, and several of items listed above provide various approaches to 3D and 6D touch parameter measurements for High-Dimensional Touch Parameter (HDTP) user interfaces. Additionally, pending U.S. Ser. No. 11/761,978 ("High Parameter-Count Touchpad Controller"), pending U.S. Ser. No. 12/418,605 ("Multi-Parameter Extraction Algorithms for Tactile Images from User Interface Tactile Sensor Arrays"), pending U.S. Ser. No. 13/038,372 ("Curve-fitting Approach to HDTP Parameter Extraction") and pending U.S. Ser. No. 12/541,948 ("Sensors, Algorithms and Applications for a High Dimensional Touchpad") describe example systems and methods for calculation of estimated finger roll and pitch angles from measured tactile sensor data.

The present invention provides additional example systems and methods for calculation of estimated finger roll and pitch angles from measured tactile sensor data and example heuristics for 3D and 6D touch gesture recognition which, for example, can be used in place of Artificial Neural Networks (ANNs) for 3D and 6D touch gesture recognition. The present invention relates to additional examples of touch parameter measurements for High-Dimensional Touch Parameter (HDTP) user interfaces.

SUMMARY

Features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

A method for determining the position of touches on a touch sensor is described including receiving values from a touch sensor, converting the values to binary data, identifying one or more contiguous touched regions, extracting parameters from each touched region that related to the shape and location of each region, and determining the validity of each region. The method also includes obtaining data from the contiguous touched regions at a later time and linking the data of the two times for the touched regions to create a series of temporal parameters. The data for the temporal parameters is filtered to remove noise, and the position of the touches is determined from the temporal parameters.

The contiguous touched regions can be approximated by ellipses whose major and minor axes can be determined. The ellipses can be compared with the contiguous touched regions to identify excess data or deficient data.

Yaw angles can be determined for each of the first and the second contiguous touched regions from the filtered temporal series of parameters. The yaw angles can further be constrained to a predetermined range of angles. The ellipses can be characterized by fitting parabolas aligned with the major and minor axes.

For purposes of summarizing, certain aspects, advantages, and novel features are described herein. Not all such advantages may be achieved in accordance with any one particular embodiment. Thus, the disclosed subject matter may be embodied or carried out in a manner that achieves or optimizes one advantage or group of advantages without achieving all advantages as may be taught or suggested herein.

These and other embodiments will also become readily apparent to those skilled in the art from the following detailed description of the embodiments having reference to the attached figures, the invention not being limited to any particular embodiment disclosed.

BRIEF DESCRIPTION OF THE DRAWINGS

The above and other aspects, features and advantages of the present invention will become more apparent upon consideration of the following description of preferred embodiments taken in conjunction with the accompanying drawing figures.

DETAILED DESCRIPTION OF EXAMPLE EMBODIMENTS

In the following, numerous specific details are set forth to provide a thorough description of various embodiments. Certain embodiments may be practiced without these specific details or with some variations in detail. In some instances, certain features are described in less detail so as not to obscure other aspects. The level of detail associated with each of the elements or features should not be construed to qualify the novelty or importance of one feature over the others.

In the following description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention.

Figure 1A:
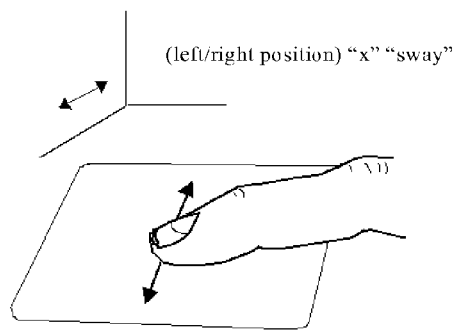
FIGS. 1a-1f show six independently adjustable degrees of freedom of touch from a single finger that can be simultaneously measured by HDTP technology.
Figure 1D:
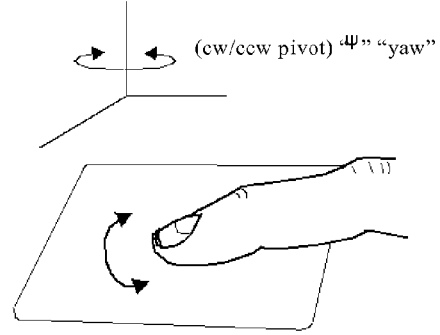
Figure 1B:
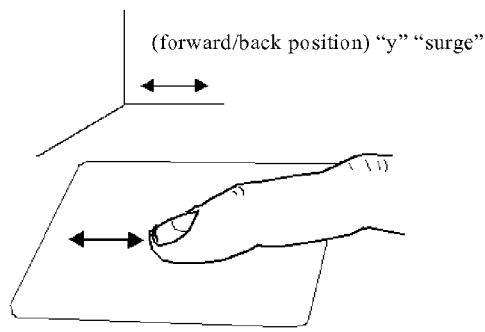
Figure 1E:
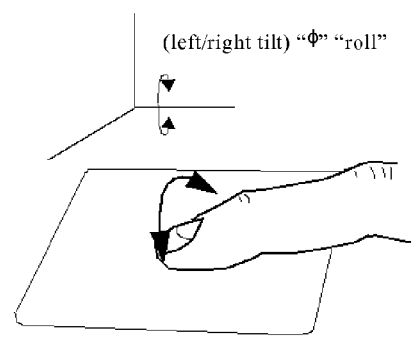
Figure 1C:
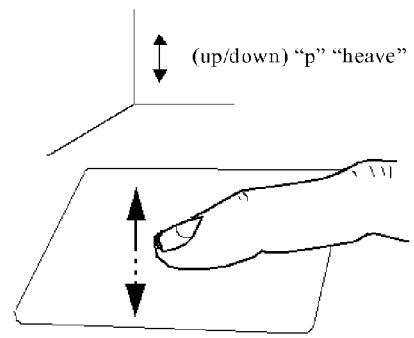
Figure 1F:
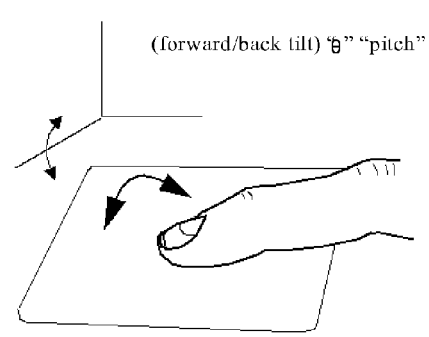

Example Hand Contact Measurements and Features Provided by High-Dimensional Touch Parameter (HDTP) User Interface Technology FIGS. 1a-1f illustrate six independently adjustable degrees of freedom of touch from a single finger that can be simultaneously measured by the HDTP technology. The depiction in these figures is from the side of the touchpad. FIGS. 1a-1c show actions of positional change (amounting to applied pressure in the case of FIG. 1c) while FIGS. 1d-1f show actions of angular change. Each of these can be used to control a user interface parameter, allowing the touch of a single fingertip to control up to six simultaneously-adjustable quantities in an interactive user interface.

Parameters for each of the six degrees of freedom can be obtained from operations on a collection of sums involving the geometric location and tactile measurement value of each tactile measurement sensor. Of the six parameters, the left-right geometric center, forward-back geometric center, and clockwise-counterclockwise yaw rotation can be obtained from binary threshold image data. The average downward pressure, roll, and pitch parameters are in some embodiments beneficially calculated from gradient (multi-level) image data. One remark is that because binary threshold image data is sufficient for the left-right geometric center, forward-back geometric center, and clockwise-counterclockwise yaw rotation parameters, these also can be discerned for flat regions of rigid non-pliable objects, and thus the HDTP technology thus can be adapted to discern these three parameters from flat regions with striations or indentations of rigid non-pliable objects.

These 'Position Displacement' parameters FIGS. 1a-1c can be realized by various types of unweighted averages computed across the blob of one or more of each the geometric location and tactile measurement value of each above-threshold measurement in the tactile sensor image. The pivoting rotation FIG. 1d can be calculated from unweighted statistical moments; alternatively a high-performance adapted eigenvector method taught in U.S. Pat. No. 8,170,346 can be used. The last two angle (i.e., finger "tilt") parameters, pitch and roll FIGS. 1e and 1f, can be calculated via heuristics disclosed in this patent; alternatively they can be determined by real-time curve fitting taught in pending U.S. patent application Ser. Nos. 13/038,372 and 13/544,960, as well as by performing calculations on various types of weighted averages and moments calculated from blob measurements and other methods (for example, such as those taught in pending U.S. patent application Ser. Nos. 13/009,845 and 61/522,239.

Figure 2:
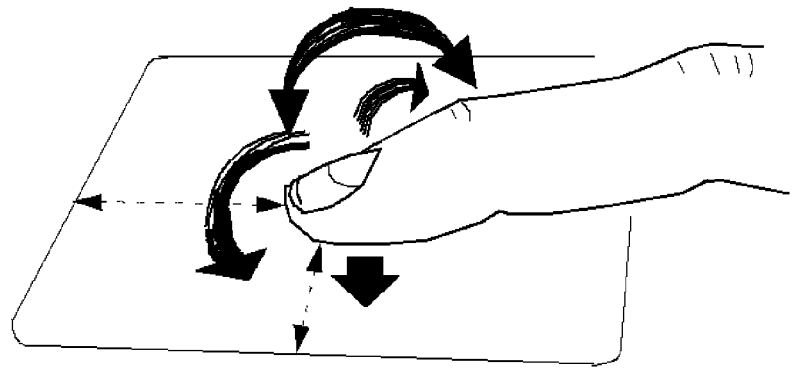
FIG. 2, shows general ways in which two or more of these independently adjustable degrees of freedom adjusted at once.

Each of the six parameters portrayed in FIGS. 1a-1f can be measured separately and simultaneously in parallel. FIG. 2 suggests general ways in which two or more of these independently adjustable degrees of freedom adjusted at once.

Figure 3:
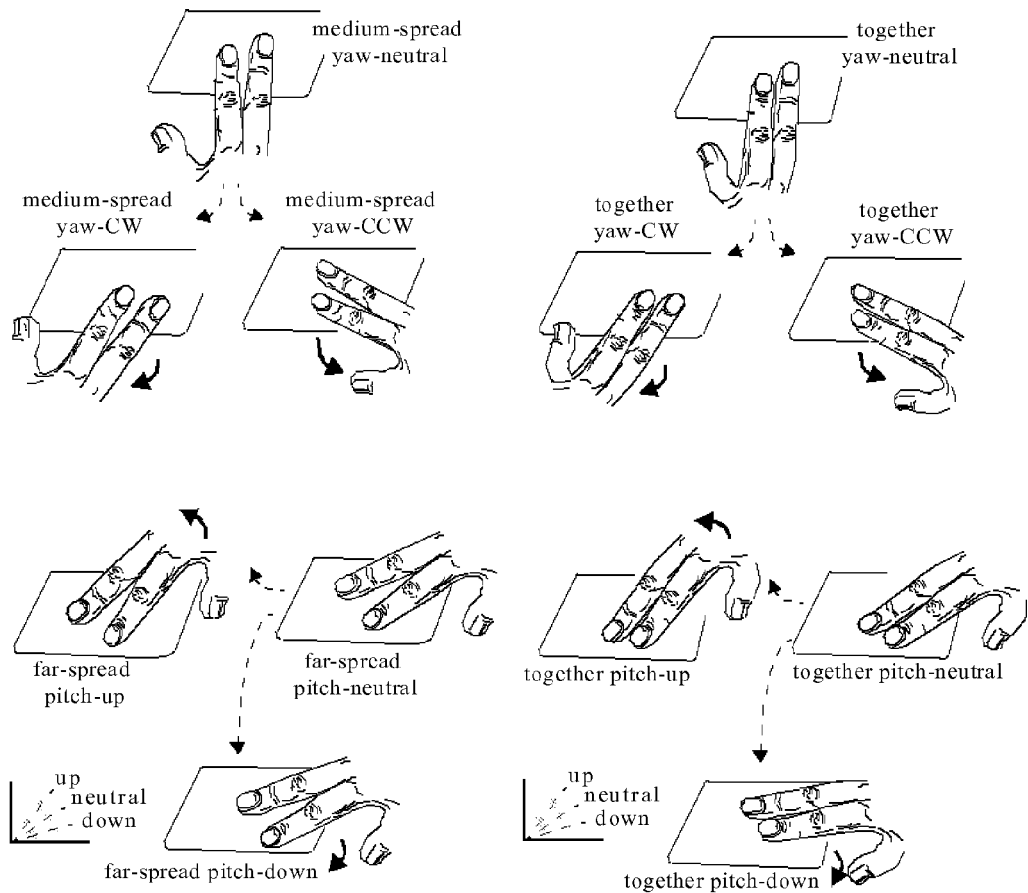
FIG. 3, depicts two-finger multi-touch postures or gestures from the many that can be readily recognized by HTDP technology.

The HDTP technology provides for multiple points of contact, these days referred to as "multi-touch." FIG. 3 demonstrates a few two-finger multi-touch postures or gestures from the hundreds that can be readily recognized by HTDP technology. HTDP technology can also be configured to recognize and measure postures and gestures involving three or more fingers, various parts of the hand, the entire hand, multiple hands, etc. Accordingly, the HDTP technology can be configured to measure areas of contact separately, recognize shapes, fuse measures or pre-measurement data so as to create aggregated measurements, and other operations.

Additionally, U.S. Pat. No. 6,570,078 and U.S. patent application Ser. No. 12/418,605 discuss the handling, recognition, and parameter extraction from tactile measurement data resulting from contact by three or more fingers and/or contact with other parts of the hand.

Example Systems and Methods for Calculation of Estimated 6D Finger Touch Parameters from Measured Tactile Sensor Data Various approaches can be taken to the implementation of algorithms implementing aspects of the present invention. For the purpose of illustration, some example definitions of concepts, structures, functions, and variables are provided below. These are meant to be illustrative and are no way to be taken as limiting; many alternatives are possible and are anticipated by the invention.

To begin, three opening representative definitions are provided below, followed by additional commentary:

Image—the instantaneous, scanned, sampled, or otherwise temporally captured output of a touch sensor array. Images can be represented by an array of values, each value representing the contact and/or degree of proximity of a user finger to the touch sensor array. In general, the invention can be applied directly or can be adapted to a wide variety of touch sensors including capacitive, resistive, pressure, and optical. In all cases, the sensor provides an array of data points that can be considered an image. For example the array could be structured as 64 columns and 48 rows, although clearly the provided example and other implementation approaches can utilize other size arrays. In this description the terms "image" and "tactile image" are used interchangeably.

Pixel—the image data consists of an array of values. Each value in the array is considered a pixel. The possible range of values for a pixel depends upon the specific tactile sensor used.

Touch Region—the region of touch and/or proximity made by one finger in contact with the touch sensor.

Blob—the related concept of any connected region in the image that is a candidate to represent a touch region or portion of a touch region. A blob could also occur as a result of noise, a defect in the touch sensor, contact with the sensor by something other than the intended or anticipated portion of the user's finger.

A touch region or associated finger proximity can be signified by larger values than those provided by rest of the touch sensor. Alternatively, smaller values can be used instead to signify a touch region or associated finger proximity, involving minor modifications to the example.

Additionally, the image coordinates assume the common (e.g., television) origin in the upper left hand corner. That is, the X coordinate runs from left to right, and the Y coordinate runs from top to bottom. Coordinates could easily be adapted to work with any orthogonal coordinate system with an origin in any location and axes that are oriented in any direction.

Further, the touch sensor provides non-binary values in the image array. However, the described invention uses thresholding to converts the non-binary image to a binary image, and many aspects will operate with a binary image provided by a touch sensor.

For example, pixels in the tactile image may have values in the range of 0 to 255. A binary image is created by using a threshold value between 0 and 255. Pixel values that are equal to or above the threshold are considered indicative of a touch (representing light) and are converted to a first predetermined value. Pixel values below the threshold are considered indicative of no touch (the background or dark) and are converted to a second predetermined value. In the present embodiment, the first predetermined value is 255 and the second predetermined value is 0. However, other predetermined values, such as 1 and 0, can also be used.

Blobs can be categorized by the following parameters and variables:

TABLE 1

Blob Parameters

| Parameter | Description |
|---|---|
| Area | area of the blob/touch region in pixels |
| X centroid | pixels from the left edge |
| Y centroid | pixels from the top edge |
| Major axis | length of the equivalent ellipse in pixels |
| Minor axis | length of the equivalent ellipse in pixels |
| Angle | angle of the equivalent ellipse major axis in radians |
| Elongation | ratio of the major axis length to minor axis length |
| Major skew | the 3rd statistical moment for the touch region along the direction of the major axis |
| Major kurtosis | the 4th statistical moment for the touch region along the direction of the major axis |
| Minor skew | the 3rd statistical moment for the touch region along the direction of the minor axis |
| Minor kurtosis | the 4th statistical moment for the touch region along the direction of the minor axis |
| Quad data | the difference in pixel count between the actual touch region and its equivalent ellipse; includes both excess pixels (touch region pixels that extend beyond the equivalent ellipse) and deficient pixels (areas of the equivalent ellipse that extend beyond the actual touch region) |
| Count | a count of the number of pixels in the touch region boundary |
| Edge points | X and Y coordinates of edge points |

TABLE 2

Blob Variables

| Varaible | Description |
|---|---|
| ImageNumber | the number of the last image merged into the blob. If a series of blobs from a new image does merge a touch region into this blob, the ImageNumber will not be updated and the blob eliminated from the list of tracked blobs |
| ImageCount | the number of images with blobs that have been merged into this blob object. It is used to manage low-pass filtering of the blob data. |
| StartTime | The time stamp of the image that initiated the blob object. |
| ElapsedTime | The time from StartTime to the time stamp of the current image. |
| AllValid | indicates that all parameters now have useful filtered information. It is possible for different parameters to have different filtering time constants; so, some filtered parameters may become valid before others |
| LocalValid | indicates that the X centroid, Y centroid, and Angle parameters all have valid filtered values |
| AreaValid | indicates that the area parameter has a valid filtered value |
| Area | the area, in pixels, of the last touch region incorporated into the CBlob object |
| FilteredArea | the area, in pixels, that has been low-pass filtered |
| BaseArea | the value of FilteredArea when AreaValid first becomes true |
| ValidX | indicates that the X centroid has a valid filtered value |
| Xcentroid | the X centroid, in pixels from the left edge of the image, of the last touch region incorporated into the CBlob object |
| FilteredXcent | the X centroid, in pixels from the left edge, that has been low-pass filtered |
| BaseX | the value of FilteredXcent when ValidX becomes true |
| LocalX | the X coordinate of the touch region adjusted for yaw angle; based on FilteredXcent and FilteredYcent as well as the yaw angle |
| LocalXchange | the latest change in the LocalX parameter; used for determining roll angle |
| ValidY | indicates that the Y centroid has a valid filtered value |
| Ycentroid | the Y centroid, in pixels from the top edge of the image, of the last touch region incorporated into the CBlob object |
| FilteredYcent | the Y centroid, in pixels from the top edge, that has been low-pass filtered |
| BaseY | the value of FilteredYcent when ValidY becomes true |
| LocalY | the Y coordinate of the touch region adjusted for yaw angle; based on FilteredXcent and FilteredYcent as well as the yaw angle |
| LocalYchange | the latest change in the LocalY parameter; used for determining pitch angle |
| MajorAxis | the length, in pixels, of the major axis of the equivalent ellipse for the latest touch region incorporated into the CBlob object |
| MinorAxis | the length, in pixels, of the minor axis of the equivalent ellipse for the latest touch region incorporated into the CBlob object |
| ValidElong | indicates that the elongation has a valid filtered value |
| Elongation | the elongation of the equivalent ellipse, major axis length divided by minor axis length, for the latest touch region incorporated into the CBlob object |
| FilteredElong | the elongation that has been low-pass filtered |
| BaseElong | the value of FilteredElong when ValidElong becomes true |
| AngleValid | indicates that the angle of the equivalent ellipse (FilteredAngle) has valid low-pass filtered data |
| Angle | angle of the equivalent ellipse major axis for the latest touch region incorporated into the CBlob object. |
| CorAngle | the Angle above adjusted to the range of ±45°. |
| FilteredAngle | the variable CorAngle that has been low-pass filtered. |
| BaseAngle | the value of FilteredAngle when AngleValid becomes true. |

TABLE 2-continued

Blob Variables

| Varaible | Description |
|---|---|
| PreviousAngle | the value of Angle for the previous touch region added to the CBlob object. It is used to insure that there is no abrupt change in angle that exceeds 45 degrees. |
| AdjustAngle | tracks angle adjustment in increments of 90°. |
| AdjustCorrection | similar to AdjustAngle above. |
| ParabDistValid | indicates that the parameters characterizing the parabolas fit to the touch region have valid filtered data. |
| A1 | the coefficient of the fit parabola to one side of the touch region for the latest touch region incorporated into the CBlob object. |
| FiltA1 | the coefficient A1 that has been low-pass filtered. |
| BaseA1 | the value of FiltA1 when ParabDistValid became true. |
| B1 | the coefficient of the fit parabola to one side of the touch region for the latest touch region incorporated into the CBlob object. |
| FiltB1 | the coefficient B1 that has been low-pass filtered. |
| BaseB1 | the value of FiltB1 when ParabDistValid became true. |
| C1 | the coefficient of the fit parabola to one side of the touch region for the latest touch region incorporated into the CBlob object. |
| FiltC1 | the coefficient C1 that has been low-pass filtered. |
| BaseC1 | the value of FiltC1 when ParabDistValid became true. |
| A2 | the coefficient of the fit parabola to the second side of the touch region for the latest touch region incorporated into the CBlob object. |
| FiltA2 | the coefficient A2 that has been low-pass filtered. |
| BaseA2 | the value of FiltA2 when ParabDistValid became true. |
| B2 | the coefficient of the fit parabola to the second side of the touch region for the latest touch region incorporated into the CBlob object. |
| FiltB2 | the coefficient B2 that has been low-pass filtered. |
| BaseB2 | the value of FiltB2 when ParabDistValid became true. |
| C2 | the coefficient of the fit parabola to the second side of the touch region for the latest touch region incorporated into the CBlob object. |
| FiltC2. | the coefficient C2 that has been low-pass filtered |
| BaseC2 | the value of FiltC2 when ParabDistValid became true. |
| ParabDist1 | the distance from the centroid for the parabola fit to one side of the touch region for the latest touch region incorporated into the CBlob object. |
| FiltDist1 | the low-pass filtered value for ParabDist1. |
| BaseDist1 | the value of FiltDist1 when ParabDistValid became true. |
| ParabDist2 | the distance from the centroid for the parabola fit to the second side of the touch region for the latest touch region incorporated into the CBlob object. |
| FiltDist2 | the low-pass filtered value for ParabDist2. |
| BaseDist2 | the value of FiltDist2 when ParabDistValid became true. |
| SumCurvature | the sum of the curvatures for the two parabolas fit to the touch region for the latest touch region incorporated in the CBlob object. |
| FiltCurvature | the low-pass filtered value for SumCurvature. |
| BaseCurvature | the value of FiltCurvature when ParabDistValid became true. |
| CurveRatio | the ratio of the curvatures of the two parabolas for the latest touch region incorporated in the CBlob object. |
| FiltCurveRatio | the low-pass filtered value for CurveRatio. |
| BaseCirveRatio | the value of FiltCurveRatio when ParabDistValid became true. |
| ValidMajorSkew | indicates the value of FiltMajSkew has valid data. |
| MajorSkew | the value for the touch region skew in the major axis direction for the latest touch region incorporated into the CBlob object. |
| FiltMajSkew | the low-pass filtered value for MajorSkew. |
| BaseMajSkew | the value of FiltMajSkew when ValidMajorSkew became true. |
| ValidMajKurtosis | Indicates the value of FiltMajKurtosis has valid data. |
| MajorKurtosis | the value for the touch region kurtosis in the major axis direction for the latest touch region incorporated into the CBlob object. |
| FiltMajKurtosis | the low-pass filtered value for MajorKurtosis. |
| BaseMajKurtosis | the value of FiltMajKurtosis when ValidMajKurtosis became true. |
| ValidMinrSkew | Indicates the value of FiltMinrSkew has valid data. |
| MinorSkew | the value for the touch region skew in the minor axis direction for the latest touch region incorporated into the CBlob object. |
| FiltMinrSkew | the low-pass filtered value for MinorSkew. |
| BaseMinrSkew | the value of FiltMinrSkew when ValidMinrSkew became true. |
| ValidMinrKurtosis | indicates the value of FiltMinrKurtosis has valid data. |
| MinorKurtosis | the value for the touch region kurtosis in the minor axis direction for the latest touch region incorporated into the CBlob object. |
| FiltMinrKurtosis | the low-pass filtered value for MinorKurtosis. |
| BaseMinrKurtosis | the value of FiltMinrKurtosis when ValidMinrKurtosis became true. |
| RollAngle | the current calculated roll angle for the touch region. |
| PitchAngle | the current calculated pitch angle for the touch region. |
| YawValid | indicates the yaw angle is valid. Currently identical to AngleValid above. |
| YawAngle | the current calculated yaw angle. |
| Quad_Deficient_Valid | an array of four boolean values indicating that the filtered values for the deficient pixels for each quadrant is valid. All four of these values are set simultaneously. The existence of four values is used to facilitate the common low-pass filtering routine. |
| Quad_Excess_Valid | an array of four Boolean values indicating that the filtered values for the excess pixels for each quadrant of the touch region is valid. The values are all set simultaneously, and, in effect are the same as the values for Quad_Deficient_Valid values. The existence of this duplication facilitates the common low-pass filtering routine. |
| Quad | an array of four structures, each with two values. One value is for deficient pixels and the other value is for excess pixels. The four array elements represent the four quadrants of the touch region. These are the values for the latest touch region incorporated into the CBlob object. |
| FilteredQuad | low-pass filtered values for the Quad parameter above. |
| BaseQuad | the values for FilteredQuad when Quad_Deficient_Valid and Quad_Excess_Valid become true. |

The above parameters and variables are illustrative examples and are not limiting; many alternatives are possible and are anticipated by the invention.

Algorithm Methods, Systems, and Implementations

Referring now to FIGS. 4-11, numbered step blocks are provided and are referred to as "steps" in the descriptions that follow.

An algorithm can be configured to detect some error conditions such as conditions that should not occur and are not part of a basic algorithm. For example, the routines can return an error code that can cause the display of an error message. Alternatively, an algorithm can be configured to terminate execution. The description below does not include a description of these error conditions, their detection, or the error messages because these conditions are not part of the basic algorithm functions.

Main Loop Procedure

Figure 4:
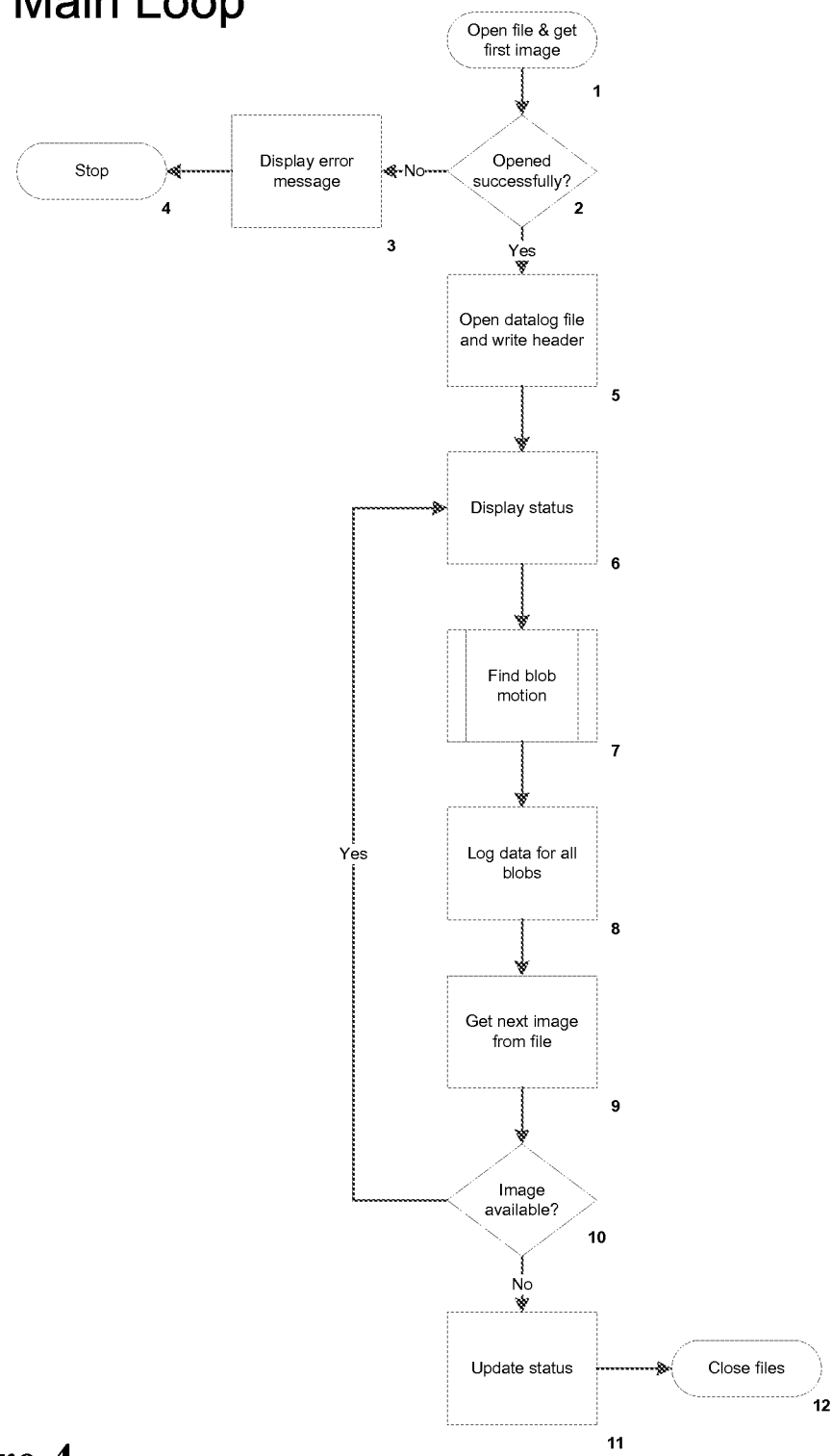
FIG. 4 depicts the main loop of an algorithm as provided for by the invention.

FIG. 4 depicts a series of steps that form a Main Loop of an algorithm.

Figure 5A:
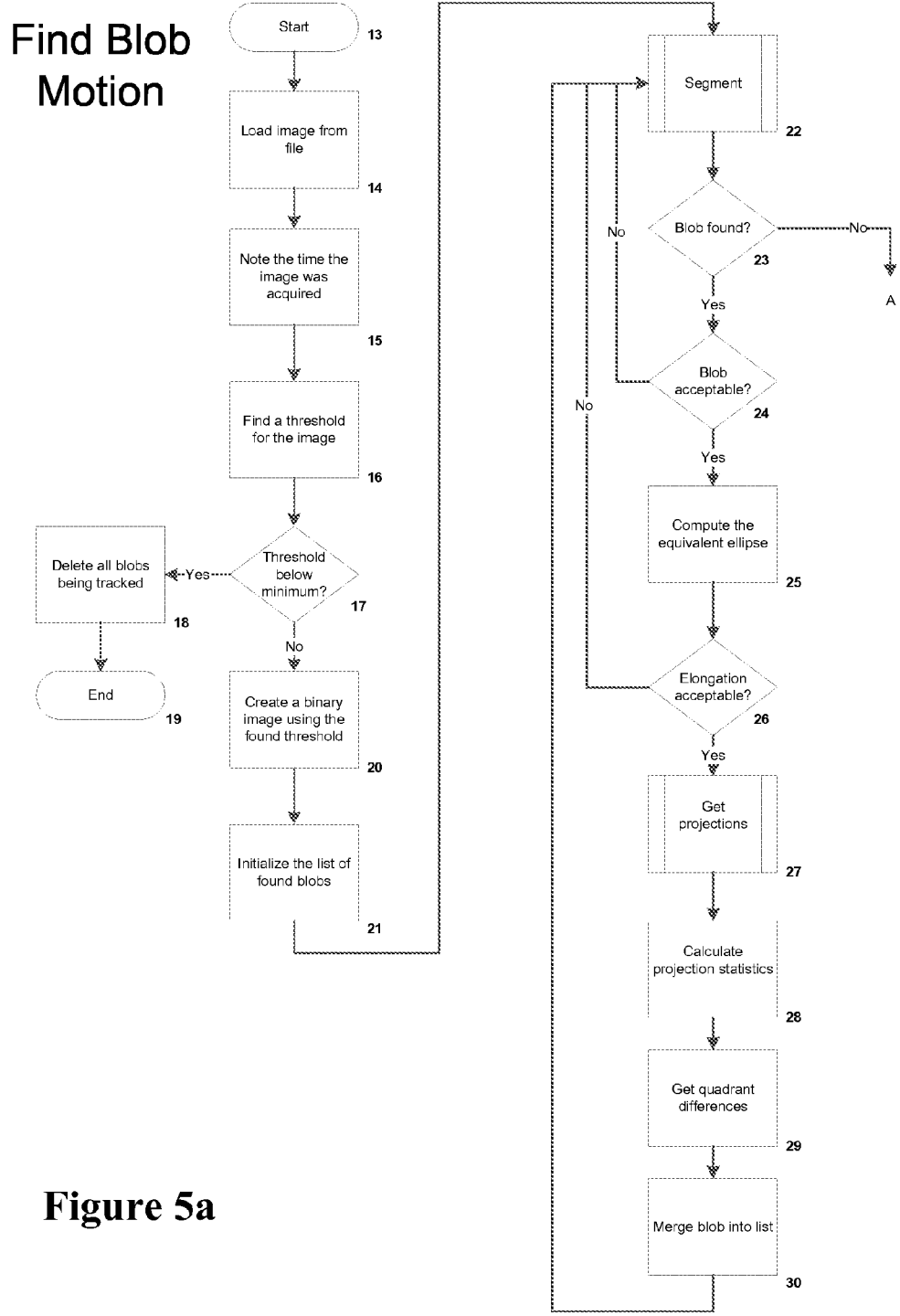
FIGS. 5a and 5b show a flowchart of an algorithm for detection of the motion of a previously identified contiguous region of tactile contact ("blob") in a tactile image.
Figure 5B:
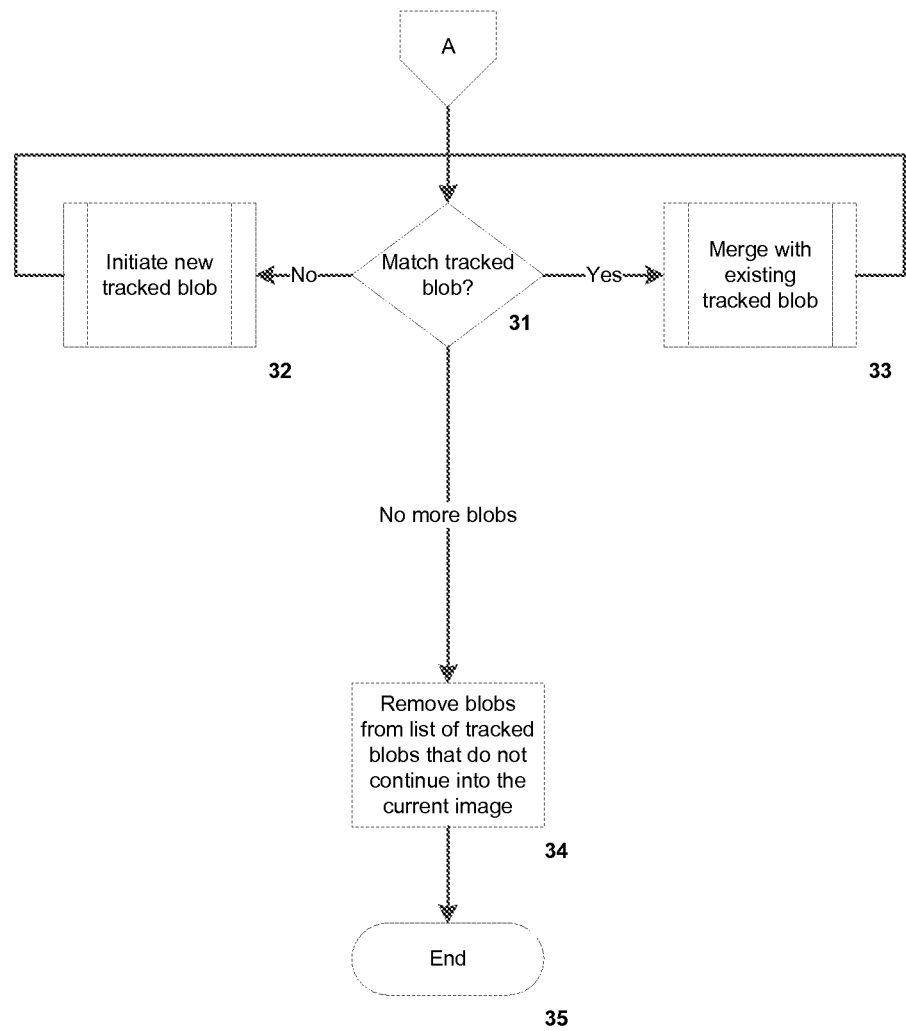
Figure 6:
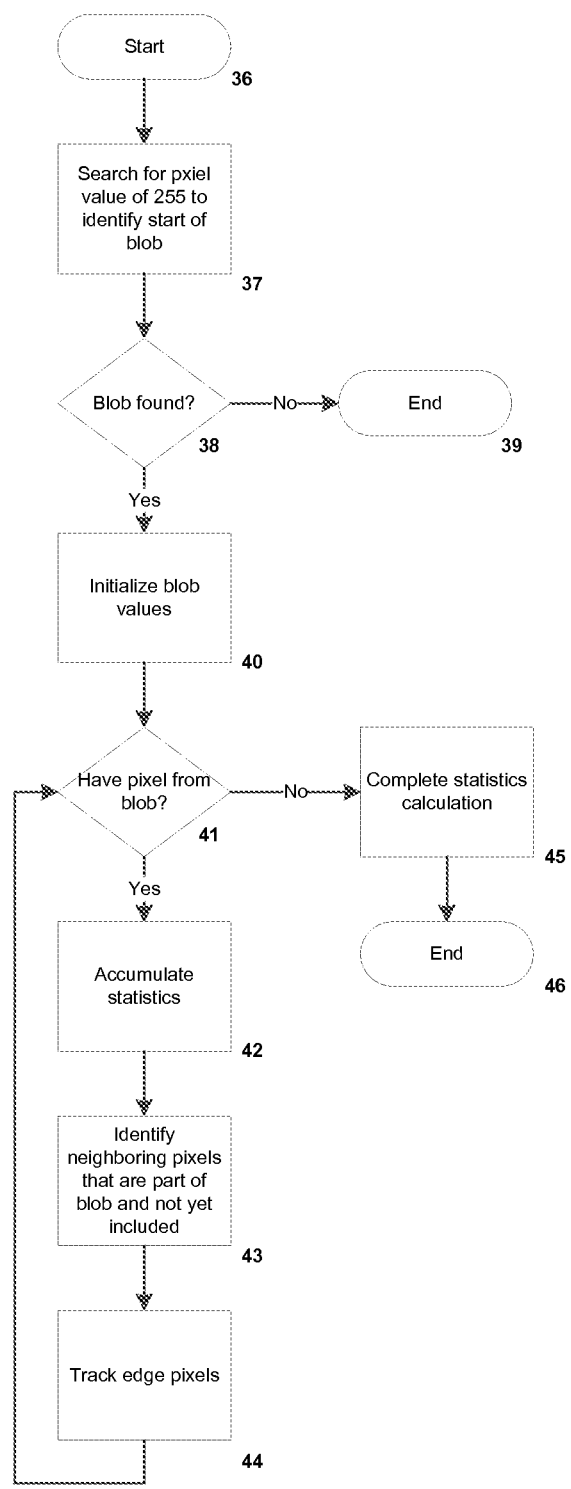
FIG. 6 is a flowchart showing an algorithm for segmentation.

Referring to FIGS. 5a, 5b, and 6, Steps 6 through 10 below represent a main loop. The loop represented by steps 6 through 10 would become an infinite loop and remain active until the touch sensor is shut down. When the software is directly coupled to a separately scanned touch sensor, only step 6 would be present.

In FIGS. 5a, 5b, and 6, an image file is cited, and this file can be a traditional file or serve as a queue (such as a ring buffer) serviced by image data updated provided in real-time or near-real-time by a touch sensor array. Alternatively, the file can be a stream provided in real-time or near-real-time by a touch sensor array.

Accordingly, prior to Step 6, Step 1 opens a file (or alternatively opens a queue or queries, samples a stream, etc.). Step 2 prompts the algorithm to test for a successful opening of the file If the opening of the file was not successful, the algorithm can provide an error indication, as depicted in Step 3. If the opening of the file was successful, Step 3 is skipped in favor of Step 4, which indicates ending the activity. Step 5 directs the algorithm to open a datalog file and write the header information.

Again, Steps 6 through 10 below represent the main loop which can be arranged (as it is here) in the form of an infinite loop. Each invocation of Step 6 can prompt an indication or display of status, providing the image number being processed. Most implementations will not require a display of this status information.

Step 7 finds the motions of the touch regions in the image. This is expanded upon in FIGS. 5a and 5b. Step 8 indicates that for each touch region found in the image, the algorithm will write the motions detected into the datalog file. Step 9 prompts retrieval of the next image from the datalog file. Step 10 directs for the algorithm to loop to Step 6 in the case another image is available.

If another image is not available or is determined to not exist, the algorithm continues to Step 11. Step 11 prompts an update of the status once the analysis has ended. Step 12 closes the image and datalog file.

Finding Blob Motion

FIGS. 5a, 5, and 6 depict an algorithm detecting the motion of a previously identified contiguous region of tactile contact ("blob") in a tactile image. Step 13 starts the procedure.

In Step 14 the image file is read. The image can be in non-binary-value form, i.e., each data value in the image ranges in possible value from zero to some maximum value (e.g., 255). Step 15 saves the time the image was acquired for use in time-stamping and in later-described filtering operations. Image values are preferably arranged on a regular square grid. However, it should be obvious to one skilled in the art that other grid patterns such as rectangles, triangles, and hexagons are possible and can be accommodated with changes known to those skilled in the art.

Step 16 prompts the algorithm to calculate a threshold for the image using Otsu's method. The example "Find Threshold function" can for example employ Otsu's method, an image processing algorithm to automatically determine an image threshold by calculating the optimum threshold separating two classes of values in a histogram distribution so that the combined intra-class variance is minimized. In Step 17, the threshold is tested to insure that it is high enough over a minimum reference value. In the case that the threshold is below a minimum set point, Step 18 prompts the algorithm to delete all blobs (touch regions) being tracked. Step 19 directs the algorithm to exit the routine once the image is empty and no blobs (touch regions) remain to be tracked. If the threshold is deemed adequate, Steps 18 and 19 can be skipped in favor of Step 20.

Step 20 describes the creation of a binary image from the gray-scale image using the found threshold. Touch regions are represented by the value 255 and the background is represented by the value 0. Step 21 prompts the list of found blobs in the image. Initially no blobs should be found.

Step 22 directs the algorithm to isolate one blob from the image. The current routine finds a blob by searching from left-to-right and from top-to-bottom. If two blobs have the same upper extent, then the one on the left will be found. The algorithm then changes the value of the pixels of the found blob from 255 to another value used for indication (for example a value of 128) to prevent their detection in the next blob search by segmentation.

The algorithm indicates if the segmentation routine does not find a blob, as directed in Step 23, which can be used to terminate the segmentation loop for finding and characterizing blobs. If no blobs are found, the algorithm is directed to skip Steps 24 to 27 in favor of Step 28. Note that it is possible that no accepted blobs are found in the image.

The blob is qualified as a potential touch region in Step 24 and Step 26. Step 24 qualifies the area of the blob as being a reasonable size anticipated for a finger tip. If other parts of the hand are anticipated to contact the sensor, then other qualifying criteria for area can be incorporated for these parts.

If a blob is detected, Step 24 describes checking it to insure that its area is within acceptable limits. If the area is too small, the detection may be something other than a touch region, such as noise or a fingernail touch. The detected blob is also checked to insure that it does not touch the edge of the image, which may cause a loss of shape that could lead to touch region pose calculation errors. If the detected blob is not within acceptable limits, it is discarded, in which case the algorithm is prompted to return to further segmenting the image in search of the next blob.

In Step 25, an ellipse is calculated with parameters from the segmentation routine (zeroth, first, and second moments). This equivalent ellipse is characterized by the lengths of its major and minor axes; elongation, which is the ratio of the major to minor axes lengths; and the angle of the major axis with respect to the X-direction.

Step 26 qualifies the blob as not being so elongated as not to be reasonable to anticipate for a finger, finger tip, etc. by checking the blob's elongation against limits. For example, if a user were to place a whole finger lengthwise on the touch panel, it could be rejected. It is theoretically impossible for elongation to be less than 1. However, because of quantization errors and round-off effects, it is possible for a number less than 1 to be returned. Also, in the present embodiment any elongation greater than 5 is ignored. A limit (such as a value of 5) can be based upon empirical data and might be changed and/or optimized as more users are tested.

Step 27 calculates projections, which are described in the next section. In Step 28, projected data is used to calculate additional statistics characterizing the blob. These statistics are the skew and kurtosis in the direction of the equivalent ellipse major axis and in the direction of the equivalent ellipse minor axis. Step 29 prompts the algorithm to determine the number of pixels for each quadrant that exceed the boundary of the equivalent ellipse, and the number of pixels of the blob that do not cover the equivalent ellipse. In Step 30, the acceptable blob (touch region) and its characteristics are merged into the list of established touch regions.

After the merge, operation returns to Step 22 to segment the next blob, or continues (via path "A") to Step 31 (FIG. 6) if the segmentation is deemed complete. Step 31 describes that when segmentation completes, the algorithm compares each of the blobs in the list of retained blobs and the list of tracked blobs against each other until they have all been compared. In the case that a blob does not match a tracked blob, Step 32 creates a new tracked blob. In the case that a blob matches a tracked blob, Step 33 merges its data into the data of the matching tracked blob. The blob, together with its associated characteristics, are merged into the blob list and bubble sorted by value of area. Accordingly, if there are more than a maximum permitted number of blobs detected, the largest blobs will be retained in the list. Step 34 directs the algorithm to delete any blobs in the list of tracked blobs that do not continue into the current image. Step 35 prompts the Find Blob Motion to exit.

Segmenting

Next considered is an algorithm for segmentation of a blob or touch region.

The segment function of step 22 is expanded In FIG. 6. The loop and tail encompassing Step 22 shown in FIG. 5 through Step 34 shown in FIG. 6 supports multi-touch capability. FIG. 6 depicts an algorithm for segmentation of a blob or touch region. A four-way connectivity region growing can be used, although other approaches, such as six-way connectivity, eight-way connectivity, boundary tracing, etc. could alternatively be used. The region growing approach can be additionally augmented to include calculation of attributes of the touch region.

Step 36 starts the procedure of an example approach. Step 37 initiates a new search for a blob. A "first pixel" with a pixel value of 255 indicates that a new blob is found. The search proceeds from right-to left and from top-to-bottom. Step 38 tests the search result to determine whether a "first pixel" is found, or whether the search stopped at the end of the image. If no "first pixel" is found, Step 39 ends the segmentation with no blob found.

If a "first pixel" is found, Step 40 describes how its pixel value is changed from 255 to another value, for example 128. This change indicates that the "first pixel" has been found and includes it in the found region. Initialization of variables for the new blob takes place. These variable include area (in pixels), minimum and maximum X and Y coordinates (which form the bounding box), and the accumulators for determining the statistical moments.

Step 41 directs the algorithm to test the blob for the availability of a "target pixel". Initially this will be the "first pixel", but later it will be one of a number of pixels that have been identified as being part of the blob. If a "target pixel" is not found, the algorithm skips Steps 42, 43, and 44, in favor of Step 45.

If a "target pixel" is identified, Step 42 directs the algorithm to update information about the blob that includes the maximum X coordinate, the minimum X coordinate, the maximum Y coordinate, the minimum Y coordinate, the area, and accumulators for statistical moments.

Step 43 involves examining the "target pixel's" four closest neighbors to see if any of them have a value of 255. Each neighboring pixel having value of 255 is saved for inclusion, and its value is changed to 128 to prevent being included a second time. Again the maximum and minimum values of X and Y are updated, and if the "target pixel" is at the edge of the blob, it is flagged as such. In the case that a "target pixel" is an edge pixel, Step 44 prompts the algorithm to add its coordinates to the list of edge pixels for the blob, and the count of the blob's edge pixels is updated as well. The algorithm then loops to Step 41 to test for a new "target pixel". If there is none, the flow passes to Step 45. In Step 45, the accumulators for statistics are divided as appropriate by the associated area value so as to normalize them for subsequent use. Step 46 concludes the segmentation procedure for one blob.

Example of Use of Projections and Advantageous Novel Forms

Figure 7:
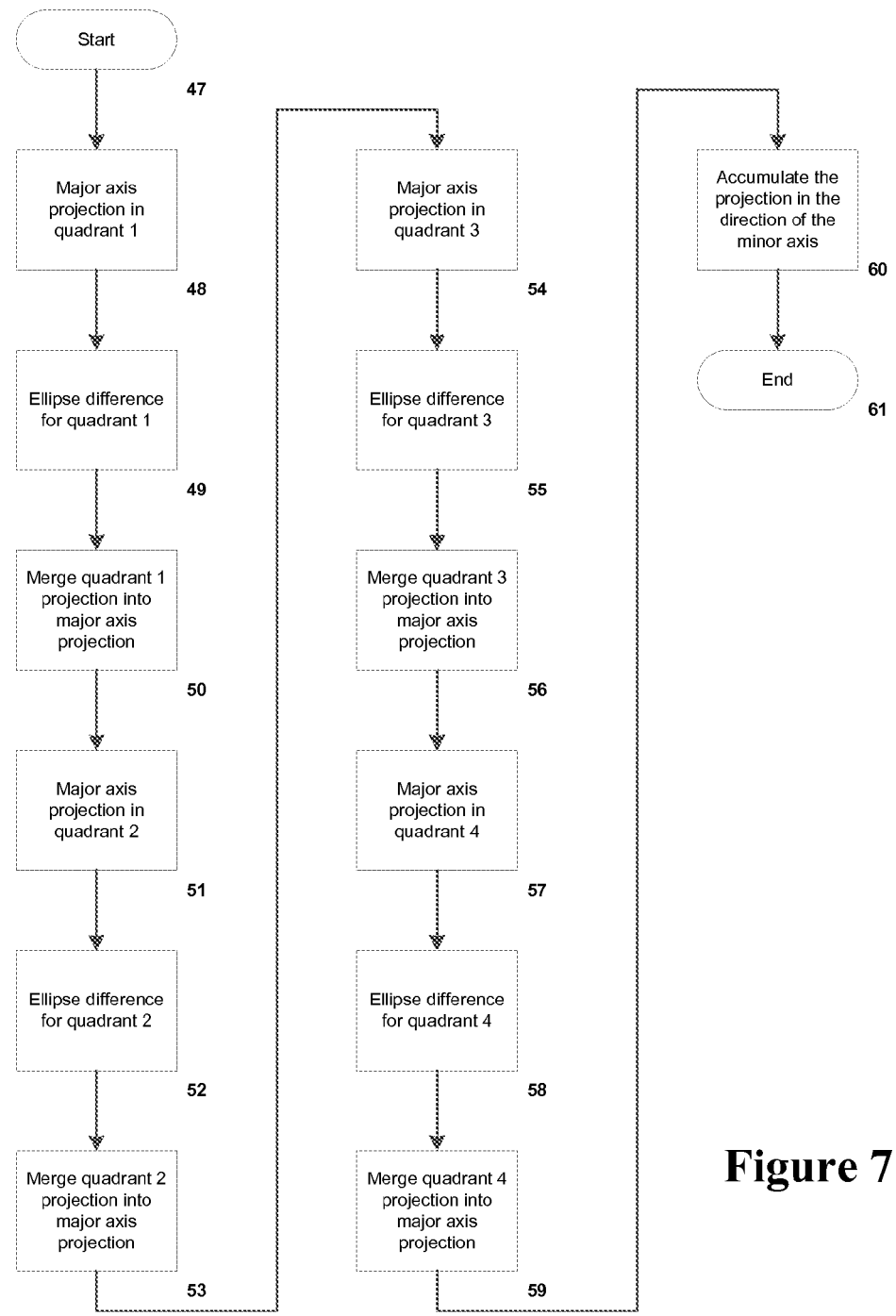
FIG. 7 is a flowchart showing an algorithm for using projections to extract features of a touched region.

As described earlier, Step 27 of FIGS. 5a and 5b invoke a projection function that is now expanded upon on FIG. 7, which depicts an an algorithm for using projections to extract features of a touched region.

While projections are a common image processing technique, this approach is unique in that it divides the touch region into quadrants and extracts projections for each quadrant. In this novel implementation, projections are used to calculate the skew and kurtosis of the touch region in the directions of the major and minor axes of the equivalent ellipse. The number of pixels indicating tactile touch or proximity activity outside the fitted ellipse boundary ("excessive") and the number of pixels indicating tactile touch or proximity activity of the fitted ellipse that are not covered by the touch region are accumulated ("deficient").

The routine uses projections as a way to extract features of a touch region. For a binary image, the projection in a direction is an array of counts of sensor locations indicating tactile touch or proximity activity (for example, having a value set to 128 after segmentation) that are perpendicular to the direction. For example, the classic vertical projection is compiled in the X direction by counting the number of light pixels in each column (Y direction). Alternatively a "non-binary" or "gray-scale" version of projections wherein the projection is calculated as the sum of non-binary image array values is used rather than a count of pixels.

Projections are accumulated by quadrants of the touch region. Quadrants are determined by the major and minor axes of the equivalent ellipse as located at the touch region's centroid. Assuming the major axis runs vertically, quadrant 1 is in the lower right fourth of the touch region, quadrant 2 is in the lower left fourth of the touch region, quadrant 3 is in the upper right fourth of the touch region, and quadrant 4 is in the upper left fourth of the touch region.

With reference to FIG. 7, Step 47 begins the projections function. Step 48 directs the algorithm to find the partial (quadrant) projection for quadrant 1. Pixels with values=128 (the value after segmentation as described in this embodiment) are included. Each included pixel's value is changed after inclusion (e.g., set to 127 in the embodiment described) so that it will not be included in subsequent projections. In Step 49, the difference is calculated between the projection for quadrant 1 and the same quadrant of the equivalent ellipse. The algorithm finds the number of pixels in the projection that lie outside the equivalent ellipse (excess) and the number of pixels in the projection that do not fill the ellipse (deficient). Step 50 merges the quadrant 1 projection into the projection for the major axis.

Step 51 directs the algorithm to find the partial projection for quadrant 2. In Step 52, the difference is calculated between the projection for quadrant 2 and the same quadrant of the equivalent ellipse. Step 53 merges the quadrant 2 projection into the projection for the major axis.

Step 54 directs the algorithm to find the partial projection for quadrant 3. In Step 55, the difference is calculated between the projection for quadrant 3 and the same quadrant of the equivalent ellipse. Step 56 merges the quadrant 3 projection into the projection for the major axis.

Step 57 directs the algorithm to find the partial projection for quadrant 4. In Step 58, the difference is calculated between the projection for quadrant 4 and the same quadrant of the equivalent ellipse. Step 59 merges the quadrant 4 projection into the projection for the major axis.

Step 60 prompts the algorithm to compute the projection in the direction of the minor axis by using four successive invocations of the partial projection for each of the four quadrants. Step 61 exits the projection routine.

Tracking

Figure 8:
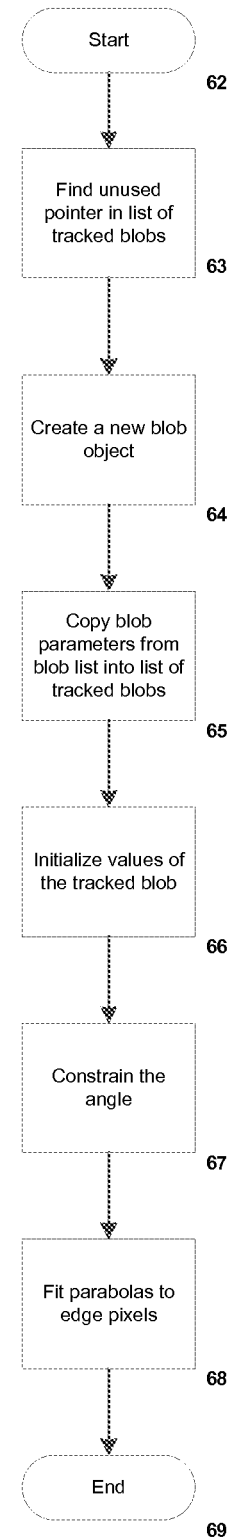
FIG. 8 is a flowchart showing an algorithm for initiating the tracking of a new contiguous region of tactile contact ("blob") in a tactile image.

As seen earlier, Step 32 on FIG. 5b is directed to a tracking function. That tracking function is now expanded upon on FIG. 8. More specifically, FIG. 8 shows an algorithm for initiating the tracking of a new contiguous region of tactile contact ("blob") in a tactile image. This largely involves initialization and transfer of data. Two unique aspects employed here are the constraint of the touch region angle Step 67, and the calculation of the parabola (for example, using the approach taught in pending U.S. patent application Ser. No. 13/038,372 "Curve-fitting Approach to HDTP Parameter Extraction") in Step 68.

Referring to FIG. 8, Step 62 begins the initiation of an example procedure for initiating a new tracked blob. Step 63 directs the algorithm to find an unused pointer in the array of pointers to tracked blobs. Unused pointers can, for example, be set to a NULL value. Step 64 creates a new blob object and puts its pointer into the list.

Step 65 involves copying the blob's parameters from the list of found blobs into the new blob. The blob's parameters are shown in Table 3 below.

TABLE 3

Copied Blob Parameters

Area
X centroid
Y centroid
Equivalent ellipse major axis length
Equivalent ellipse minor axis length
Angle of the equivalent ellipse
Elongation (ratio of major to minor axis lengths)
The skew in the direction of the major axis
The kurtosis in the direction of the major axis
The skew in the direction of the minor axis
The kurtosis in the direction of the minor axis
The differences (deficient and excess pixels) between the blob and the equivalent ellipse for each quadrant Step 66 initializes certain values in the blob object, for example:
 a. The image number—essential for tracking blobs from image to image
 b. The image count is set to 1 (this is the first image for that blob)
 c. The start time as read in from the image file
 d. The elapsed time is set to zero In Step 67, an angle parameter (for example, the yaw angle) can be constrained to be in a pre-specified range (for example ±45° or other range deemed reasonable for the system or application). However if the eccentricity of the touch region shape changes from an ellipse of an initial major axis/minor axis orientation through a circle to an ellipse with the major and minor axes interchanged, the brute-force calculated angle will jump by 90 degrees. This is a physically unreasonable condition, but can be compensated for by tracking and subsequent post processing.

Step 68 directs the algorithm to fit parabolas to the left and right side of the touch point using the saved edge points. The coordinates are shifted to represent a horizontal array so that they can be fit to the equation of the equivalent ellipse. The function can also be configured to calculate and provide other values, for example such as a distance between the fitted parabola curve and the blob centroid.

Step 69 ends the initiation of the new tracked blob.

Merging

Figure 9:
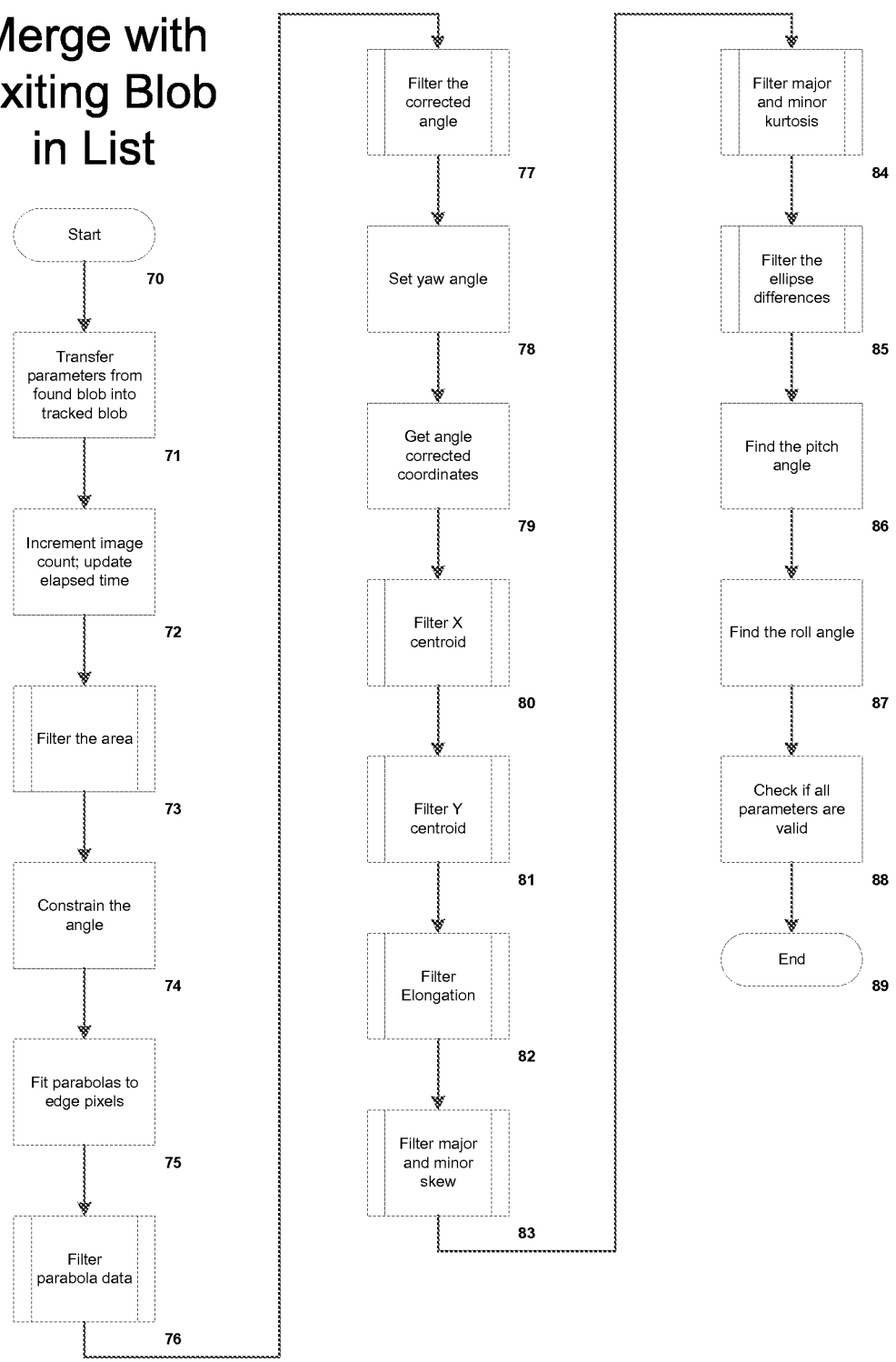
FIG. 9 is a flowchart showing an algorithm for, among other things, merging parameters associated with and/or calculated from a newly found contiguous region of tactile contact ("found blob") in a tactile image with those of a previously tracked contiguous region of tactile contact ("tracked blob") in the tactile image.

As seen earlier, Step 33 on FIG. 5b is directed to a merging function. Step 33 is expanded upon in FIG. 9. FIG. 9 depicts an algorithm for merging parameters associated with or calculated from a newly found contiguous region of tactile contact ("found blob") in a tactile image with those of a previously tracked contiguous region of tactile contact ("tracked blob") in the tactile image.

FIG. 9 depicts aspects of a number of heuristics. Filtering and heuristics associated with steps 73, 76, 77, 80, 81, 82, 83, 84, and 85 are expanded upon on further in FIGS. 10, and 11a and 11b discussed in the sections to follow. In FIG. 9, steps 71, 74, and 75 correspond to associated steps in FIG. 9 where the touch region data structure is initialized. The determination of yaw (step 78), pitch (step 86), and roll (step 87) are all calculated accordingly.

Referring to FIG. 9 depicting the merging of a blob, Step 70 starts the process. In Step 71, the algorithm transfers the parameters from the matching found blob into the tracked blob. These parameters can include area, X centroid, Y centroid, major axis, minor axis, angle, elongation, image number, major skew, major kurtosis, minor skew, minor kurtosis, and the quad data representing the touch point and ellipse differences.

Step 72 prompts the algorithm to increment the image count. The elapsed time is updated based on the start time of the tracked blob and the time that the found blob was merged into the tracked blob.

Step 73 filters the area parameter.

Step 74 involves retrieving a constrained version of the angle that is limited to ±45°. This is based on the presumption that it is physically impractical for the user to go beyond this limit. It is possible continuing work will change this constraint.

Step 75 fits parabolas to the edge pixels. Step 76 filters the parabola data. Step 77 filters the constrained angle.

Step 78 sets the yaw angle equal to a constrained angle. Step 79 obtains angle corrected coordinates.

Step 80 filters the X centroid data. Step 81 filters the Y centroid data.

Step 82 filters the elongation. Note that it is unnecessary to filter the major and minor axes lengths. Step 83 filters the skew in the direction of the major axis, and filters the skew in the direction of the minor axis.

Step 84 filters the kurtosis in the direction of the major axis, and filters the kurtosis in the direction of the minor axis.

Step 85 filters the quad data, which consists of the deficient and excess pixels for each quadrant of the blob (touch point).

Step 86 prompts the algorithm to determine a pitch angle. The current heuristic is the change in the local Y coordinate (angle corrected) multiplied by a scale factor (currently −0.5) multiplied by the square root of the filtered area divided by pi. Note that the square root of the area divided by pi is the equivalent radius.

Step 87 prompts the algorithm to determine a roll angle. The current heuristic is the change in the local X coordinate (angle corrected) multiplied by a scale factor (currently 1.0) multiplies by the square root of the filtered area divided by pi. Note that the square root of the area divided by pi is the equivalent radius.

Step 88 involves checking the validity of all parameters. This indicates valid filtered data for all parameters.

Step 89 concludes the routine to merge found blob data into a tracked blob.

Filtering

Figure 10:
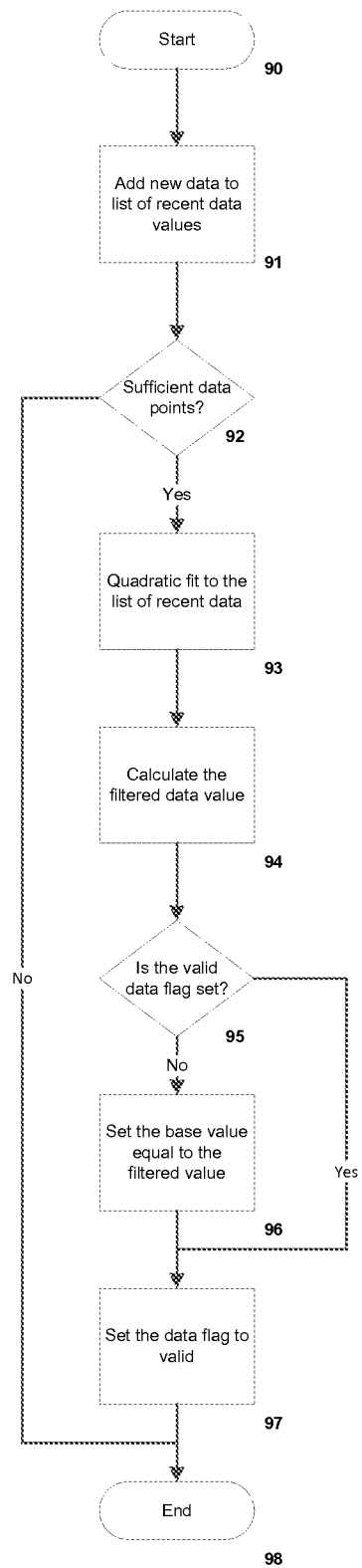
FIG. 10 is a flowchart showing an algorithm for filtering of data as provided for by the invention and, for example, as employed to filter various parameter streams as called out throughout the example arrangement depicted in FIG. 10.

FIG. 10 depicts an algorithm for filtering of data as provided for by the invention and filters various parameter streams as called out throughout the arrangement depicted in FIG. 10.

Common filters employed in image processing often utilize moving windows in space and/or time. The problem with such filtering approaches is the resulting delay between a finger's current action and the measured action: for example any noticeable delay could cause hand-eye coordination problems for the user.

The approach employed uses a quadratic fit to the trajectory of any given parameter. The time span (number of images or input occurrences or actual elapsed time) is set independently for each parameter. Presently the time span is a constant, but it could be a variable based, say, on the rate of change of a parameter. Once fit, the solution for the quadratic function for the current time is used as a best noise reduced value for the parameter. Other predictive filters, such as the Kalman filter, can also or alternatively be employed.

The example filtering routine starts with Step 90. At step 91, a saved time sequence of data for the parameter that is being filtered is kept [HistoricData]. The data elements in the time sequence are shifted as new data [NewData] is added to the head of the time sequence.

In Step 92, the number of acquired data points is checked. Each parameter has a set number [PointCount] that must be acquired before the data is considered valid. This number is the filter constant or low-pass cut-off. If insufficient data points have been acquired, filtering cannot take place, and the routine exits.

In Step 93, a quadratic fit is made to the data stored in the time sequence array. The number of data points used for the fit is determined by the specified number of data points for that parameter. Both the HistoricData and the corresponding time series are used. In Step 94, the quadratic fit and the current time from the time series are used to calculate a value for the current time. This value serves as the filtered value for the parameter.

Step 95 involves checking to see if the data valid flag is set. If not, this is the first valid filtered data result and the flow proceeds to Step 96. Otherwise Step 96 is skipped and the flow moves to Step 97. At Step 96, the first valid filtered data for the touch region parameter being filtered is made available. It is also stored for use as a base or starting value for subsequent filtering operations of at least the parameter being currently filtered. Step 97 sets a data valid flag to "True" so as to indicate that valid filtered data is available.

Step 98 ends the filtering routine.

Parameter Calculations

Figure 11A:
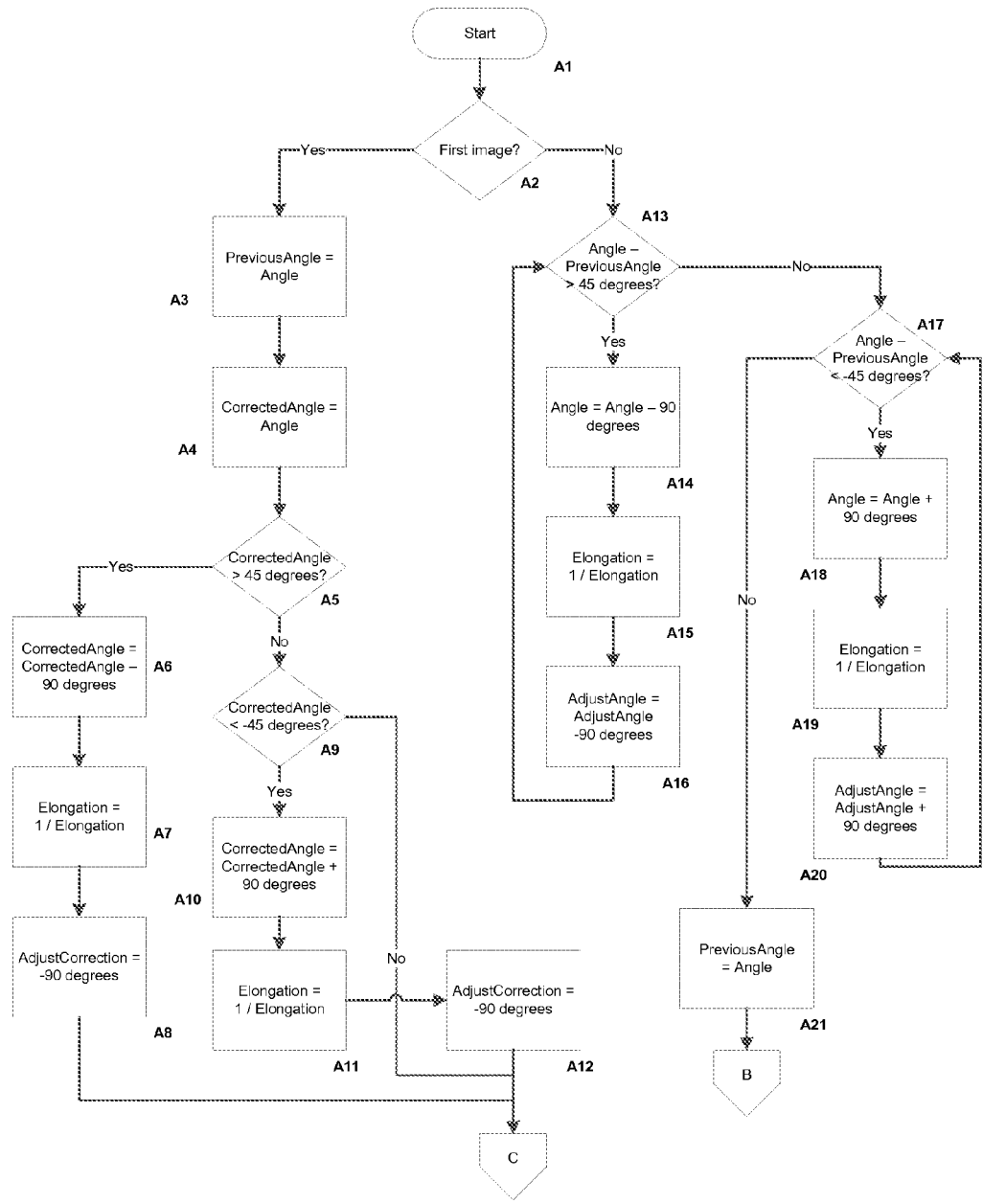
FIGS. 11a and 11b show a flowchart of an algorithm for a parameter calculation—in this case the finger yaw angle.
Figure 11B:
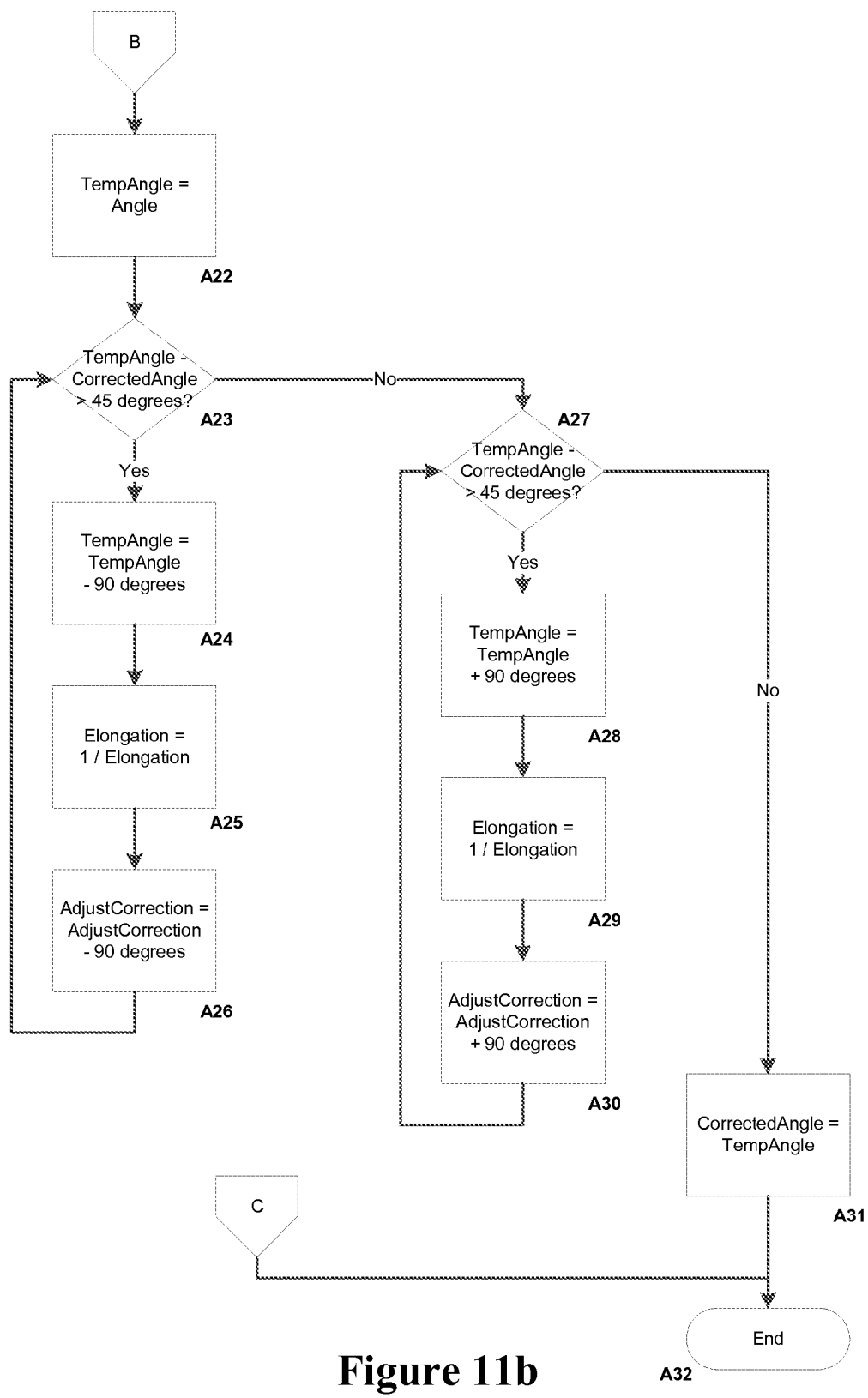

FIGS. 11*a* and 11*b* depict an algorithm for various touch parameter calculations such as the finger yaw angle. The present invention develops an approach involving ellipse-based curve-fitting and the orientation of the resultant major and minor elliptical axes.

The user sits at one side of the touch pad. For a touch pad that uses conventional imaging coordinates, the origin will be in the far left corner from the user. Other touch sensing technologies will have their own coordinates.

The touch region planar orientation ("yaw") angle is often taken to be the angle of the major axis of the equivalent ellipse. The range of this angle may be limited to +/−45 degrees. The range limitation, which may need to be revised with additional testing, is based on a physical constraint from what is realistically achievable by a user. The rate of change can also be limited and can be based on the assumption that a user cannot move a finger more than a few degrees between tactile image scans. No interpretation of touch region motion would be made from the first tactile contact that invokes the initialization.

The user's finger may be constrained to an angle of +/−45 degrees from the vertical (the direction from the top of the touch pad toward the operator). Such a constraint, in some circumstances, can advantageously benefit from an ability to adjust—for example, a user who is using their right hand might have a useful range of from −90 to perhaps 10 degrees, but a user using their left hand might have a range of −10 to 90 degrees.

In FIGS. 11*a* and 11*b*, a calculated "raw" angle value ("Angle") is dictated by the angle of the major axis of the equivalent ellipse with the X axis of the touch sensor. As the finger's pose changes, the equivalent ellipse changes shape. Under some circumstances, the ellipse transitions through a circle with the major and minor axes being exchanged. This results in a very fast jump transition of 90 degrees. Without correction of this angle, determining the change in pose (that is, the change in roll, pitch, and yaw) would have errors.

A first corrective step is to rotate the angle in steps of 90 degrees until it within the prescribed range (+/−45 degrees). At each rotation, there is a corresponding reinterpretation of which axis of the equivalent ellipse is the major axis and the minor axis. Consequently, the elongation value must be inverted for each adjustment.

A second corrective step accepts that the resulting change in angle cannot change abruptly from its previous value in the interval between reading the touch sensor. That interval could be taken to be fixed temporal value (for example ⅙₀th of a second), a scan interval duration, a multiple of a scan interval duration, etc. In the corrective step, unless it is the first time the touch region has been detected, the angle is further constrained to be within +/−45 degrees of the previous angle. The angle is adjusted in increments of 90 degrees until it is within this range of the previous angle. The elongation is inverted for each change of 90 degrees. This adjustment can provide a final angle that is outside the previously prescribed +/−45 degree range. Additionally, if it is not the first occurrence of the touch region, the preceding step can be eliminated and the angle only adjusted to be within +/−45 degrees of prior touch region angle.

The terms "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

While the invention has been described in detail with reference to disclosed embodiments, various modifications within the scope of the invention will be apparent to those of ordinary skill in this technological field. It is to be appreciated that features described with respect to one embodiment typically can be applied to other embodiments.

The invention can be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

Although exemplary embodiments have been provided in detail, various changes, substitutions and alternations could be made thereto without departing from spirit and scope of the disclosed subject matter as defined by the appended claims. Variations described for the embodiments may be realized in any combination desirable for each particular application. Thus particular limitations and embodiment enhancements described herein, which may have particular advantages to a particular application, need not be used for all applications. Also, not all limitations need be implemented in methods, systems, and apparatuses including one or more concepts described with relation to the provided embodiments. Therefore, the invention properly is to be construed with reference to the claims.

The invention claimed is:

1. A method for determining the position of one or more touches on a touch sensor, the method comprising:
   receiving values from a grid of touch sensing elements, wherein the values are responsive to a first touch on a touch sensitive surface of the touch sensor;
   converting the received values to binary data in which each of the received values of each of the touch sensing elements is assigned one of two values;
   identifying at least one first contiguous touched region from the binary data;
   extracting a plurality of parameters for each first contiguous touched region wherein the plurality of parameters are responsive to the shape and position of each contiguous touched region;
   determining whether each of the first contiguous touched regions is valid by comparing at least one of the extracted parameters to established values;
   receiving values from a second touch, converting the values of the received second touch data into binary data of the second touch, identifying at least one second contiguous touched region, extracting the parameters from the binary data of the second touch, and determining whether the binary data of the second touch is valid wherein the first touch immediately precedes the second touch;
   linking the first with the second contiguous touched regions thereby creating a temporal series of parameters that are responsive to the shape and position of each of the first and the second contiguous touched regions; and
   filtering the temporal series of parameters to remove noise, wherein yaw angles are determined for each of the first and the second contiguous touched regions from the filtered temporal series of parameters, and the yaw angles are constrained to a predetermined range of angles.

2. The method of claim 1, further comprising approximating each of the first and second contiguous touched regions with ellipses thereby creating a first and a second ellipse.

3. The method of claim 2 further comprising identifying excess data defined by the first and second contiguous touched regions exceeding their respective ellipses.

4. The method of claim 2 further comprising identifying deficient data defined by the first and second ellipses exceeding their respective contiguous touched regions.

5. The method of claim 2, further comprising fitting parabolas to opposite sides of the first and second ellipses.

6. The method of claim 5 wherein the parabolas are aligned with major and minor axes of the first and the second ellipses.

7. The method of claim 1 wherein the converting the received values to binary data uses an adaptive threshold.

8. A method for determining the position of one or more touches on a touch sensor, the method comprising:
   receiving values from a grid of touch sensing elements, wherein the values are responsive to a first touch on a touch sensitive surface of the touch sensor;
   converting the received values to binary data in which each of the received values of each of the touch sensing elements is assigned one of two values;
   identifying at least one first contiguous touched region from the binary data;
   extracting a plurality of parameters for each first contiguous touched region wherein the plurality of parameters are responsive to the shape and position of each contiguous touched region;
   determining whether each of the first contiguous touched regions is valid by comparing at least one of the extracted parameters to established values;
   receiving values from a second touch, converting the values of the received second touch data into binary data of the second touch, identifying at least one second contiguous touched region, extracting the parameters from the binary data of the second touch, and determining whether the binary data of the second touch is valid wherein the first touch immediately precedes the second touch;
   linking the first with the second contiguous touched regions thereby creating a temporal series of parameters that are responsive to the shape and position of each of the first and the second contiguous touched regions;
   identifying excess data defined by the first and second contiguous touched regions exceeding their respective ellipses, and fitting parabolas to opposite sides of the first and second ellipses; and
   filtering the temporal series of parameters to remove noise.

9. The method of claim 8, wherein yaw angles are determined for each of the first and the second contiguous touched regions from the filtered temporal series of parameters.

10. The method of claim 9, wherein the yaw angles are constrained to a predetermined range of angles.

11. The method of claim 8, further comprising approximating each of the first and second contiguous touched regions with ellipses thereby creating a first and a second ellipse.

12. The method of claim 8, further comprising identifying deficient data defined by the first and second ellipses exceeding their respective contiguous touched regions.

13. The method of claim 8 wherein the parabolas are aligned with major and minor axes of the first and the second ellipses.

14. The method of claim 8, wherein the converting the received values to the binary data uses an adaptive threshold.

\* \* \* \* \*